United States Patent
Suehiro

(10) Patent No.: US 6,247,834 B1
(45) Date of Patent: Jun. 19, 2001

(54) VEHICLE HEADLAMP

(75) Inventor: Yoshio Suehiro, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/305,222

(22) Filed: May 5, 1999

(30) Foreign Application Priority Data

May 15, 1998 (JP) .................................................. 10-133383

(51) Int. Cl.[7] .................................................. G01B 5/25
(52) U.S. Cl. ...................... 362/463; 362/460; 362/512; 362/515; 362/523
(58) Field of Search ..................................... 362/515, 523, 362/531, 532, 514, 421, 423, 512, 273, 287, 460, 461, 462, 463, 524

(56) References Cited

U.S. PATENT DOCUMENTS

| 5,029,051 | 7/1991 | Shirai et al. | 362/66 |
| 5,032,964 | * 7/1991 | Endo et al. | 362/61 |
| 5,065,293 | 11/1991 | Mochizuki | 362/273 |
| 5,067,052 | 11/1991 | Suzuki et al. | 362/61 |
| 5,067,056 | * 11/1991 | Suzuki et al. | 362/66 |
| 5,083,244 | 1/1992 | Shirai et al. | 362/61 |
| 5,121,303 | 6/1992 | Shirai et al. | 362/61 |
| 5,138,532 | * 8/1992 | Shirai et al. | 362/66 |
| 5,150,958 | 9/1992 | Miyazawa et al. | 362/66 |
| 5,343,372 | 8/1994 | Shirai et al. | 362/66 |
| 5,381,313 | 1/1995 | Choji | 362/66 |
| 5,459,646 | 10/1995 | Sato | 362/66 |
| 5,488,547 | 1/1996 | Hiroaka | 362/66 |
| 5,539,625 | * 7/1996 | Turley, Jr. et al. | 362/66 |

* cited by examiner

Primary Examiner—Stephen Husar
Assistant Examiner—John Anthony Ward
(74) Attorney, Agent, or Firm—Sughrue, Mion, Zinn, Macpeak & Seas, PLLC

(57) ABSTRACT

A vehicle headlamp including: a reference member mounted on and fixed to a vehicle body; an inclinable member including a light source mounted thereon, and disposed in the reference member inclinably with respect to the reference member for setting an optical axis of the headlamp; an aiming mechanism for adjusting the inclination of the inclinable member in the vertical direction thereof as well as in the right and direction thereof with respect to the reference member; and an inclination measuring device interposed between the reference member and the inclinable member for measuring the inclination of said optical axis of the headlamp in the right and left direction thereof, while a zero point adjustment operation portion of a zero point adjust mechanism disposed in the inclination measuring device is exposed outwardly of the reference member, the headlamp being characterized in that a hide member is mounted directly on the zero point adjustment operation portion or on a vertical wall formed integrally with the reference member in such a manner as to surround the zero point adjustment operation portion, and the zero point adjustment operation portion is hidden by the hide member.

12 Claims, 14 Drawing Sheets

VEHICLE HEADLAMP

BACKGROUND OF THE INVENTION

1. Field of the Invention

The present invention relates to a vehicle headlamp in which a reflector serving as an inclinable member with a light source mounted thereon is supported by an aiming mechanism so that it is inclinable with respect to a lamp body serving as a reference member mounted on and fixed to a vehicle body or the like and, between the lamp body and reflector, an inclination measuring device is disposed for measuring the inclination of the reflector in the right and left direction thereof (that is, the inclination of the optical path of the lamp in the right and left direction thereof). More particularly, the invention relates to a vehicle headlamp in which a zero point adjustment operation portion of a zero point adjusting mechanism provided in the inclination measuring device is exposed to the outside of the lamp body serving as the reference member.

2. Related Art

As a structure for a headlamp of the above-mentioned type, conventionally, there has been known a structure as shown in FIGS. 19 and 20. That is, a reflector c with a light source b mounted thereon is supported by an aiming mechanism (which is composed of two aiming screws d, e and a ball joint f) to be inclinable with respect to a lamp body a mounted on and fixed to a vehicle body, and, if a rotation operation portion $d_1$, $e_1$ disposed on the rear end portion of an aiming screw projecting backwardly of the lamp body a is rotated, then the reflector c is inclined in the vertical direction as well as in the right and left direction thereof to thereby be able to adjust the position of the optical axis L of the lamp.

Between the lamp body a and reflector c, there is provided an inclination measuring device g including a slide member $g_1$ which is slidable back and forth by an amount proportional to the amount of inclination of the reflector c, whereby the amount of inclination of the reflector c in the right and left direction thereof with respect to the reference position thereof is measured in accordance with the amount of displacement or sliding of the slide member $g_1$ with a scale m added thereto. A zero point adjust screw h shown in FIG. 20 is formed in a cylindrical body with the slide member $g_1$ stored in the interior portion thereof and projects backwardly of the lamp body a. If the zero point adjust screw h is rotated a scale zero point position in the inclination measuring device g is adjusted.

An inclination measuring device i consisting of a level which is mounted on the upper surface wall of the reflector c and is used to measure the amount of inclination of the reflector c in the vertical direction thereof with respect to the reference position thereof (that is, the amount of inclination of the optical axis L of the lamp in the vertical direction thereof). A zero point adjust screw j is provided in the inclination measuring device i.

Now, when putting a vehicle such as an automobile onto the market, the lamp is adjusted in such a manner that the optical axis L thereof is set at a proper position by the aiming mechanism (that is, the aiming screws d, e) and further the zero point position of the zero point adjust mechanism in the inclination measuring devices g, i is adjusted properly by the zero point adjust screws h, j, before the automobile is put onto the market. After that, if the optical axis L of the lamp is out of order for some reason or other, then indicators in the inclination measuring devices g, i indicate not the scale zero point but a value (a graduation) equivalent to the amount of displacement of the optical axis L and, therefore, if the aiming screws d, e are rotated to thereby adjust the inclination measuring devices g, i so that the indicators in the inclination measuring devices g, i can indicate the zero point, then the optical axis L of the lamp can be returned to the proper position.

However, in the above-mentioned conventional headlamp, since the zero point adjust screw h of the inclination measuring device g projects backwardly of the lamp body a, there is a fear that a user can rotate the zero point adjust screw h in error to thereby cause the scale zero point in the inclination measuring device g to be out of order, which makes it impossible not only to check whether the optical axis L of the lamp lies at its proper position or not, but also to make an aiming adjustment when the optical axis L of the lamp is out of order.

SUMMARY OF THE INVENTION

The present invention aims at eliminating the drawbacks found in the above-mentioned conventional headlamp. Accordingly, it is an object of the invention to provide a vehicle headlamp which hides the zero point adjustment operation portion from the outside, which is exposed outwardly of a reference member, of a measuring device for measuring the inclination of an optical axis in the right and left direction thereof to thereby be able to keep the zero point of the inclination measuring device from being out of order.

In attaining the above object, according to the invention, there is provided a vehicle headlamp which includes: a reference member mounted on and fixed to a vehicle body; an inclinable member including a light source mounted thereon, and disposed in the reference member inclinably with respect to the reference member for setting an optical axis of the headlamp; an aiming mechanism for adjusting the inclination of the inclinable member in the vertical direction thereof as well as in the right and direction thereof with respect to the reference member; and an inclination measuring device interposed between the reference member and inclinable member for measuring the inclination of the optical axis of the headlamp in the right and left direction thereof, while a zero point adjustment operation portion of a zero point adjust mechanism disposed in the inclination measuring device is exposed outwardly of the reference member. In the headlamp according to the present invention, a hide member is mounted directly on the zero point adjustment operation portion or on a vertical wall formed integrally with the reference member in such a manner as to surround the zero point adjustment operation portion, and the zero point adjustment operation portion is hidden by the hide member.

According to the structure of the invention, since, after completion of the aiming adjustment by the aiming mechanism, the zero point adjustment operation portion of the zero point adjust mechanism of the inclination measuring device is hidden by the hide member, the adjustment of the zero point of the zero point adjust mechanism is difficult, thereby being able to prevent the zero point from being adjusted on the user side.

Because the zero point adjustment operation portion of the zero point adjust mechanism is prevented from being operated in error on the user side, there is no fear that the zero point of the inclination measuring device can be out of order, thereby being able to always check by the inclination measuring device whether the optical axis of the headlamp in the right and left direction thereof is set at a proper position or not. Therefore, when the optical axis of the headlamp is inclined in the right and left direction thereof, not only the inclination amount thereof can be measured accurately but also the optical axis of the headlamp can be adjusted to the proper position in the right and left direction by the aiming mechanism.

According to another aspect of the invention, the zero point adjustment operation portion consists of a rotation operation portion formed in the rear end portion of a zero point adjust screw, the vertical wall consists of a rear extension portion formed in a measuring device case fixed to the reference member, the rear extension portion extends up a position beyond the rotation operation portion of the zero point adjust screw, and the hide member is composed of a cap which is mounted on the rear extension portion of the measuring device case.

According to another aspect of the invention, the zero point adjustment operation portion consists of a rotation operation portion formed in the rear end portion of a zero point adjust screw, the vertical wall consists of a rear extension portion formed in a measuring device case fixed to the reference member, the rear extension portion extends up a position beyond the rotation operation portion of the zero point adjust screw, and the hide member is composed of a cap which is mounted on rotation operation portion and is inserted into the rear extension portion of the measuring device case.

According to still another aspect of the invention, the zero point adjustment operation portion consists of a rotation operation portion formed in the rear end portion of a zero point adjust screw, the vertical wall consists of a rear extension portion formed in a measuring device case fixed to the reference member, the rear extension portion extends up a position beyond the rotation operation portion of the zero point adjust screw, and the hide member is formed of a filler member which is charged from the opening end portion of the rear extension portion of the measuring device case into a gap between the rear extension portion and rotation operation portion and is then hardened therein.

Further, according to the invention, the zero point adjustment operation portion consists of a rotation operation portion formed in the rear end portion of a zero point adjust screw, the vertical wall consists of a rear extension portion formed in a measuring device case fixed to the reference member, the rear extension portion extends up a position beyond the rotation operation portion of the zero point adjust screw, and the hide member is composed of a plate-shaped cover member so disposed as to extend through the rear extension portion and cross the opening end portion of the rear extension portion.

Furthermore, according to the inventions, the rotation operation portion serving as the zero point adjustment operation portion is situated within the rear extension portion of the measuring device case, and thus the rotation operation portion can be rotated using a rotation operating tool which is inserted from the rear end opening of the measuring device case, so that the zero point adjustment of the inclination measuring device can be made smoothly.

Also, since the rotation operation portion of the zero point adjust screw is surrounded by the rear extension portion of the measuring device case, not only when the cap is mounted but also when it is not mounted, there is no fear that the zero point adjust screw can be rotated in error, which eliminates the possibility that the zero point of the inclination measuring device can be out of order.

According to still another aspect of the invention, the rear extension portion of the measuring device case is composed of a plurality of tongue-shaped extension portions.

Therefore, when mounting the cap, the tongue-shaped extension portions are deformed elastically to thereby be able to mount the cap onto the rear extension portion of the measuring device case smoothly.

Moreover, according to the invention, the cap is prevented against rotation with respect to the rear extension portion of the measuring device case, and an engaging projecting portion provided on the cap is engaged with an engaging recessed portion formed on the rotation operation portion side, so that the cap is prevented against rotation with respect to the rotation operation portion as well.

That is, since the zero point adjust screw is fixed (is prevented against rotation) in the peripheral direction thereof with respect to the rear extension portion of the measuring device case, there is no room for rotation of the zero point adjust screw.

In addition, according to the invention, the zero point adjustment operation portion consists of a rotation operation portion formed in the rear end portion of a zero point adjust screw, the vertical wall consists of a rear extension portion formed in a measuring device case fixed to the reference member, the rotation operation portion of the zero point adjust screw projects backwardly of the rear extension portion of the measuring device case, and the hide member is mounted on the rotation operation portion in such a manner that it can be idly rotated, or on the rear extension portion of the measuring device case in such a manner that it can be idly rotated.

Therefore, according to the structure of the invention, since the zero point adjustment operation portion projects backwardly of the rear extension portion of the measuring device case, the zero point adjustment can be made smoothly. At the same time, the cap serving as the hide member can be mounted simply on the rotation operation or on the rear extension portion of the measuring device case, so that the rotation operation portion serving as the zero point adjustment operation can be hidden simply.

In a state in which the cap is mounted, since the cap is rotated idly with respect to the rotation operation or with respect to the rear extension portion of the measuring device case, even if the cap is rotated, the zero point adjust screw is prevented against rotation.

Further, according to still another aspect of the invention, in the reference member, there is disposed a rotation operation portion of an aiming screw of the aiming mechanism for adjusting the inclination of the inclinable member in the right and left direction thereof in such a manner that the rotation operation portion is exposed, and a hide member is mounted directly on the rotation operation portion, or a hide member is mounted on a vertical wall which is so formed in the reference member as to not only extend therefrom but also surround the rotation operation portion, so that the rotation operation portion of the aiming screw can be hidden by the hide member from the outside.

In this structure, since, after completion of the aiming adjustment by the aiming mechanism, the rotation operation portion of the aiming screw is hidden by the hide member from the outside, the aiming adjustment is difficult, which prevents the aiming adjustment from being made on the user side.

DESCRIPTION OF THE PREFERRED EMBODIMENT

The preferred embodiment will now be described in detail with reference to accompanying drawings.

Figure 1:
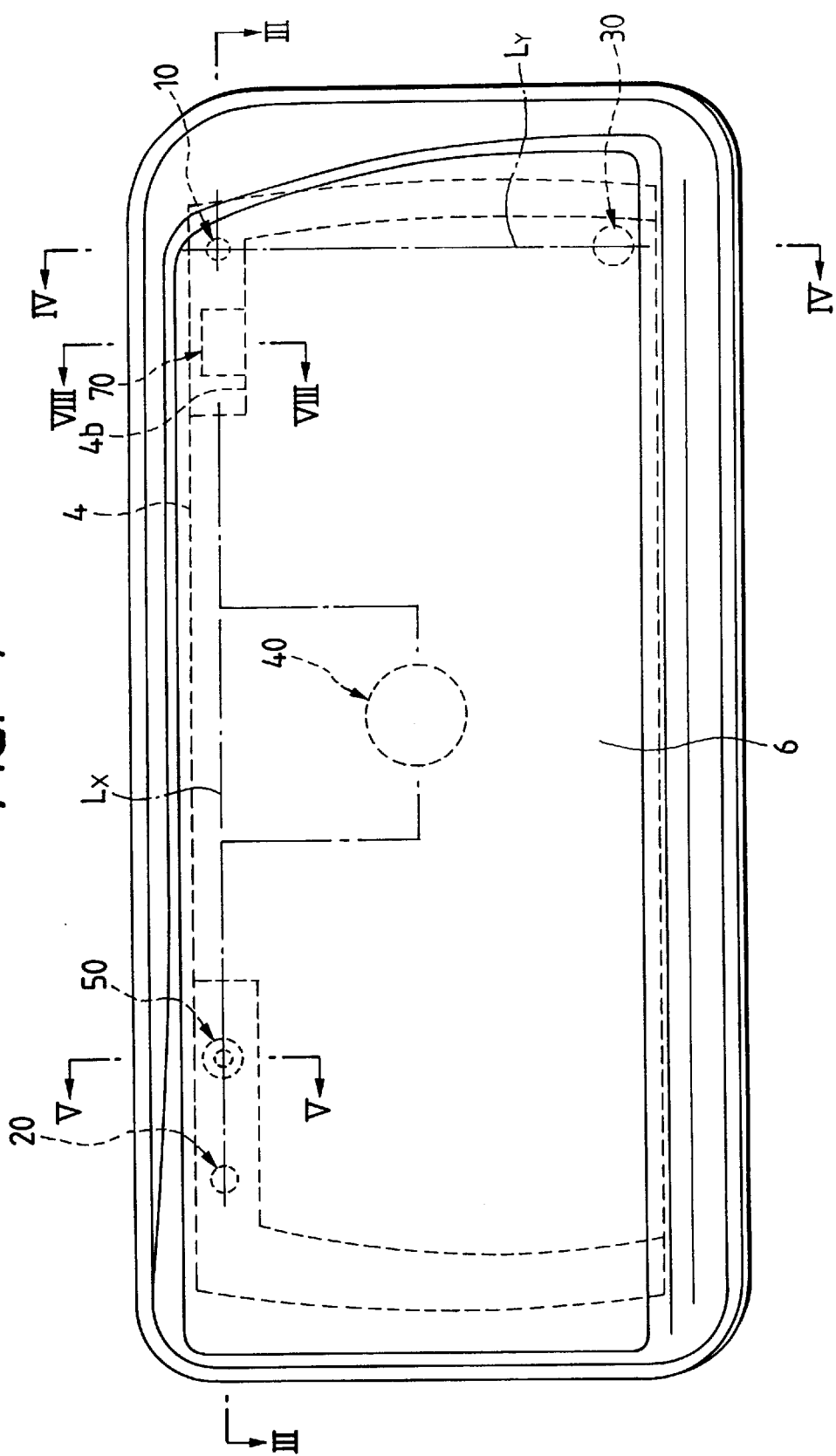
FIG. 1 is a front view of a headlamp of a movable reflector type according to a first embodiment of the invention.
Figure 2:
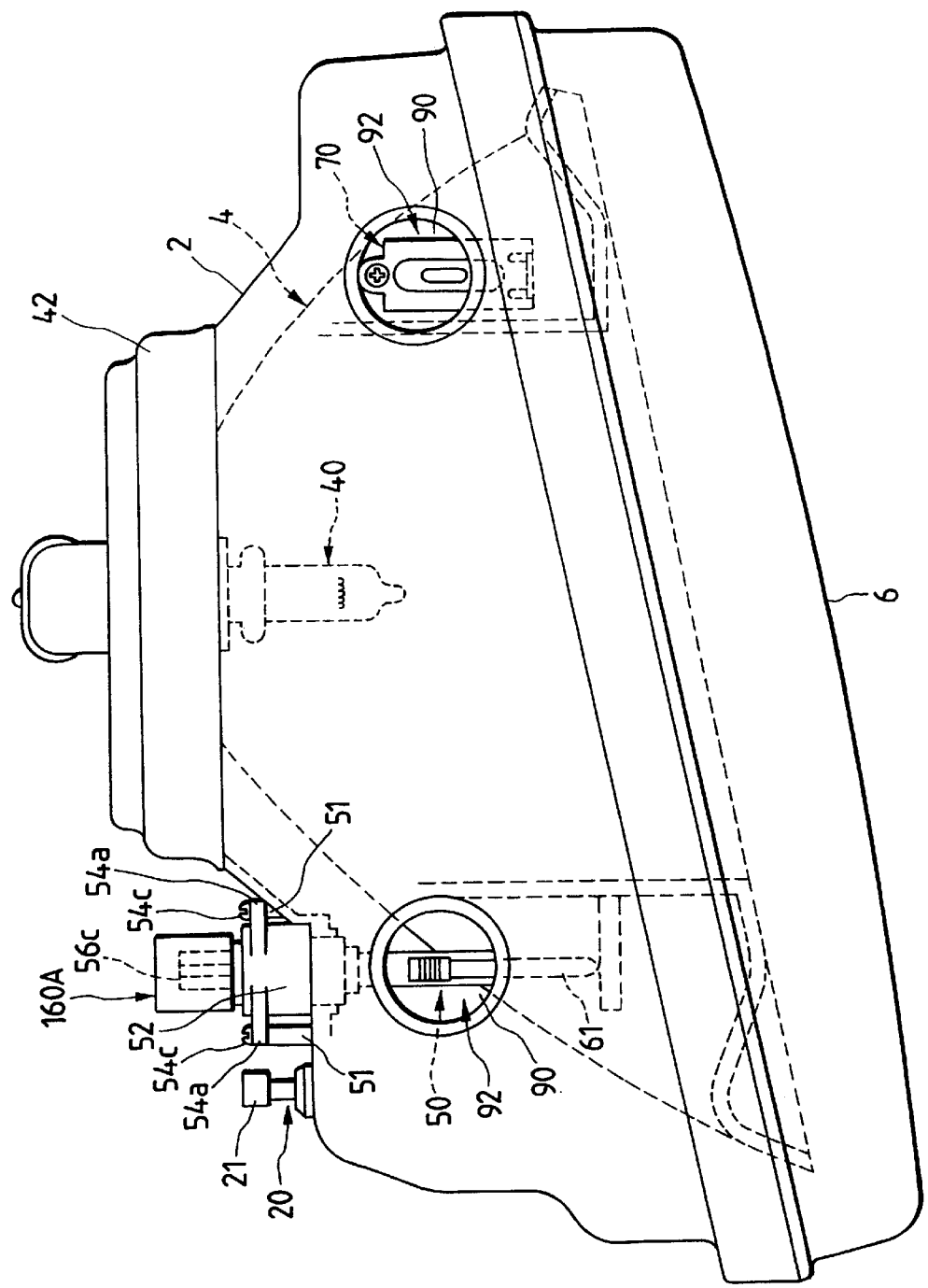
FIG. 2 is a plan view of the above headlamp.
Figure 3:
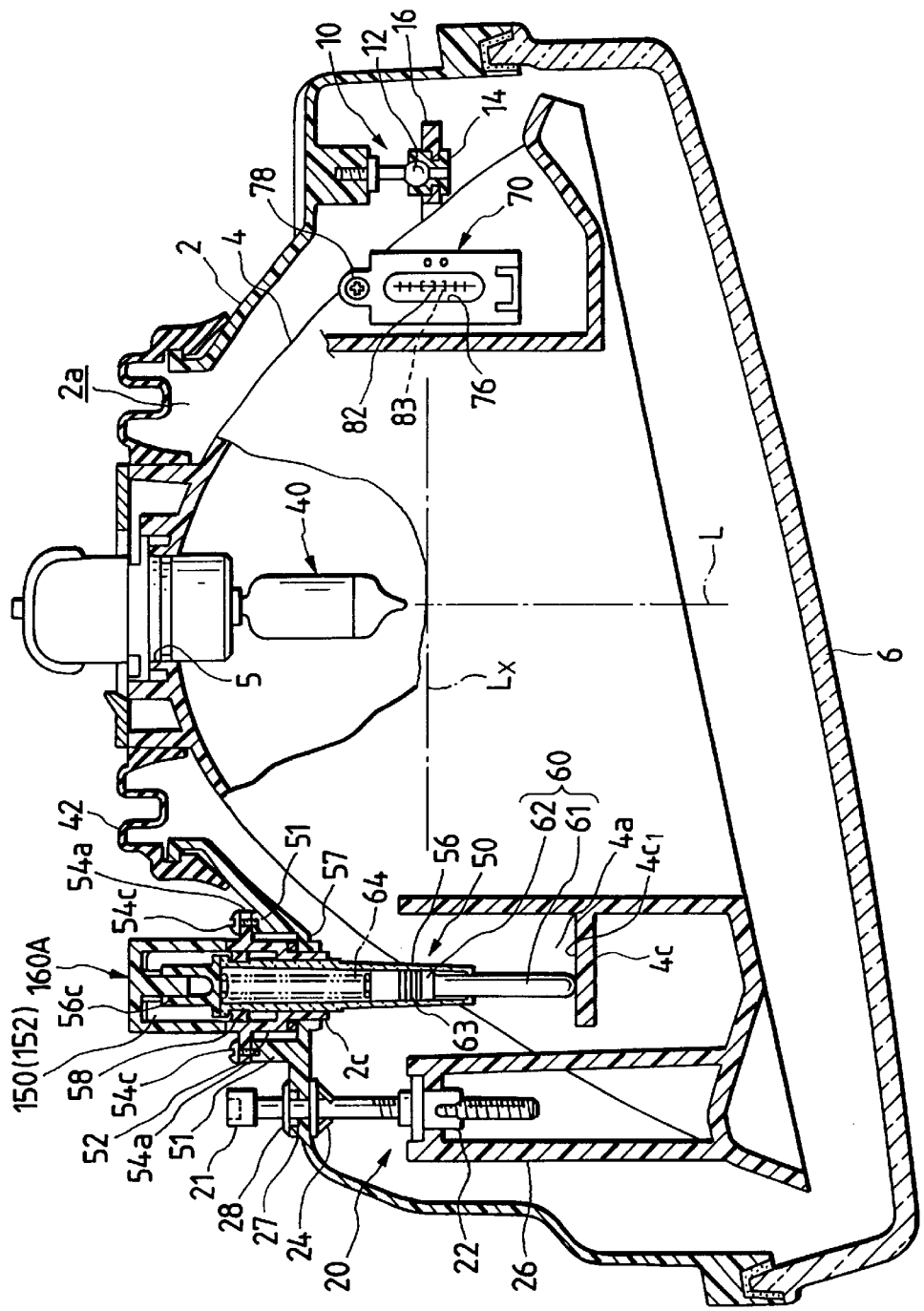
FIG. 3 is a horizontal section view, broken away in part, of the above headlamp (that is, a section view taken along the line III—III shown in FIG. 1)
Figure 4:
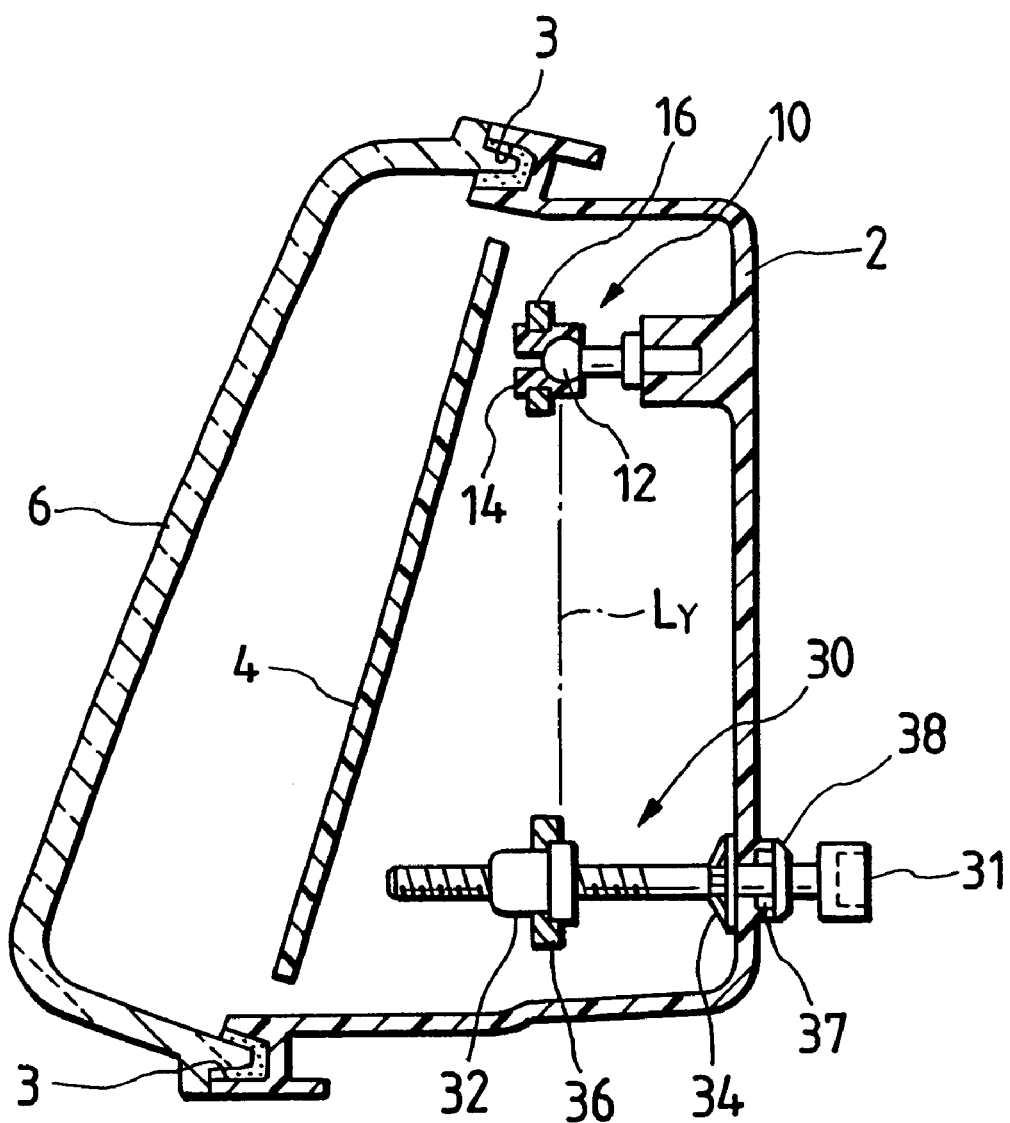
FIG. 4 is a longitudinal section view of the above headlamp (that is, a section view taken along the line IV—IV shown in FIG. 1)
Figure 5:
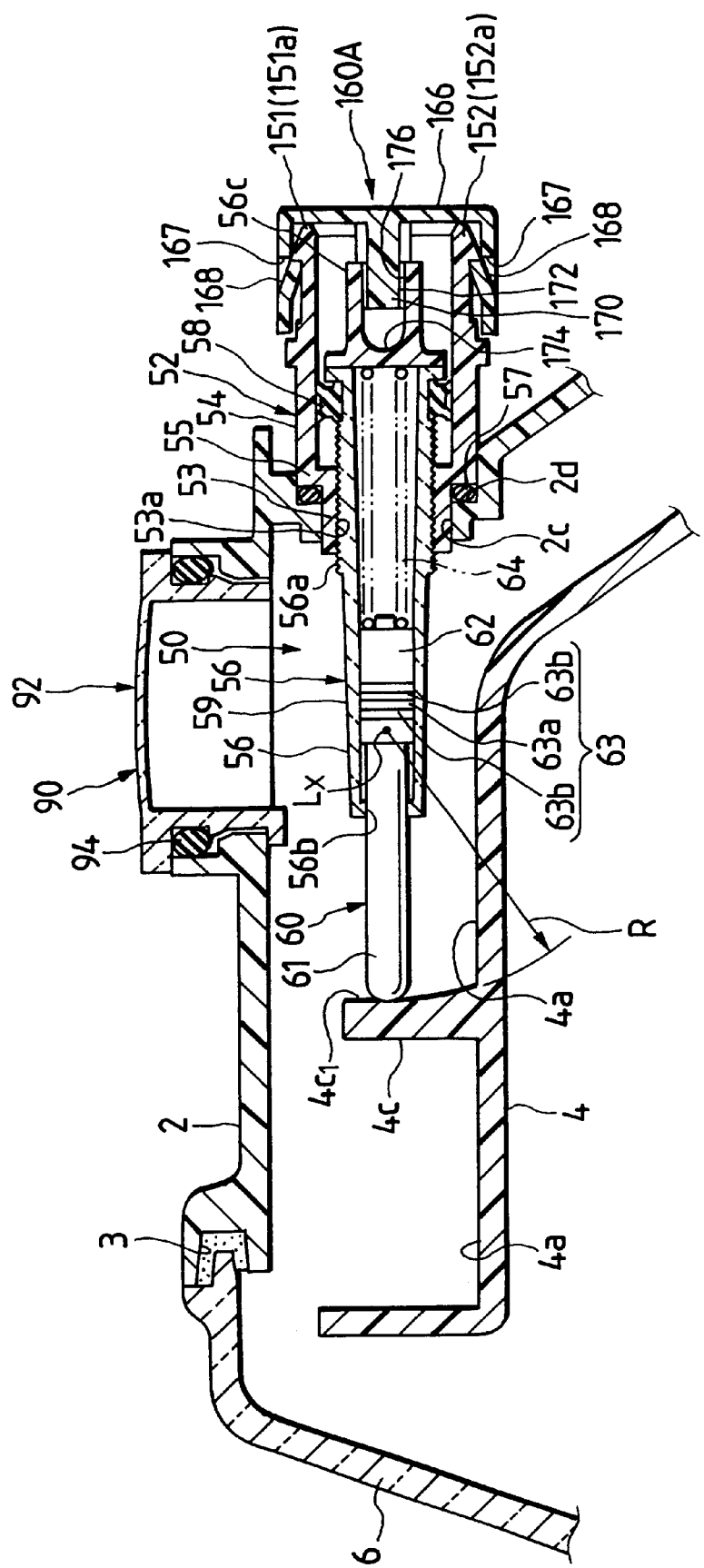
FIG. 5 is a section view of the above headlamp, showing a state thereof in which an inclination measuring device for measuring the inclination of the headlamp is disposed at its given position (that is, a section view taken along the line V—V shown in FIG. 1)
Figure 6:
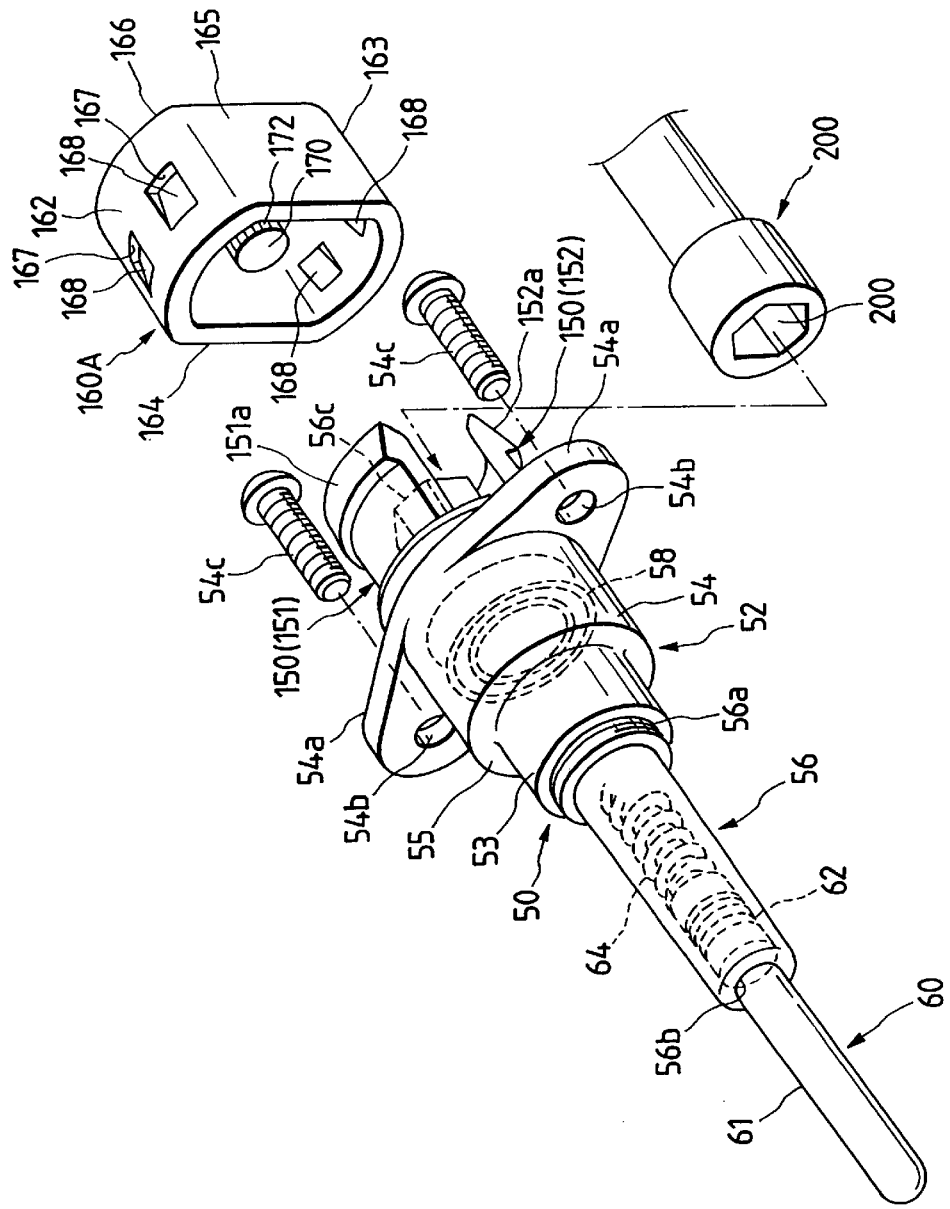
FIG. 6 is an enlarged perspective view of the above inclination measuring device.
Figure 7:
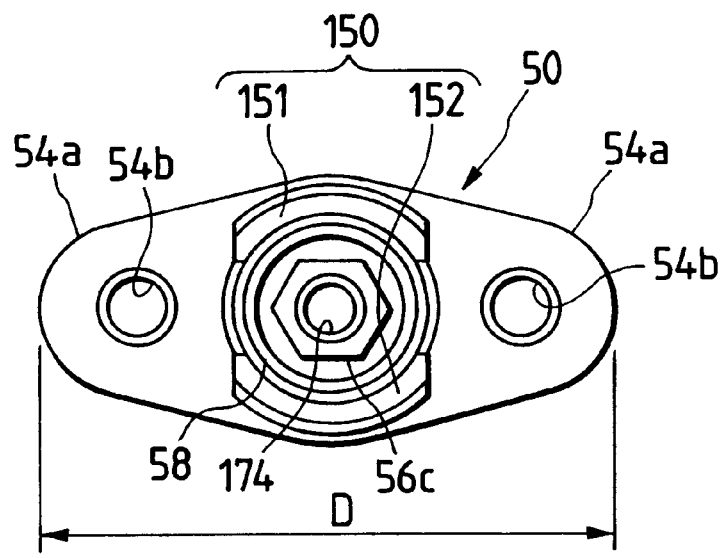
FIG. 7 is a back view of the above inclination measuring device.
Figure 8:
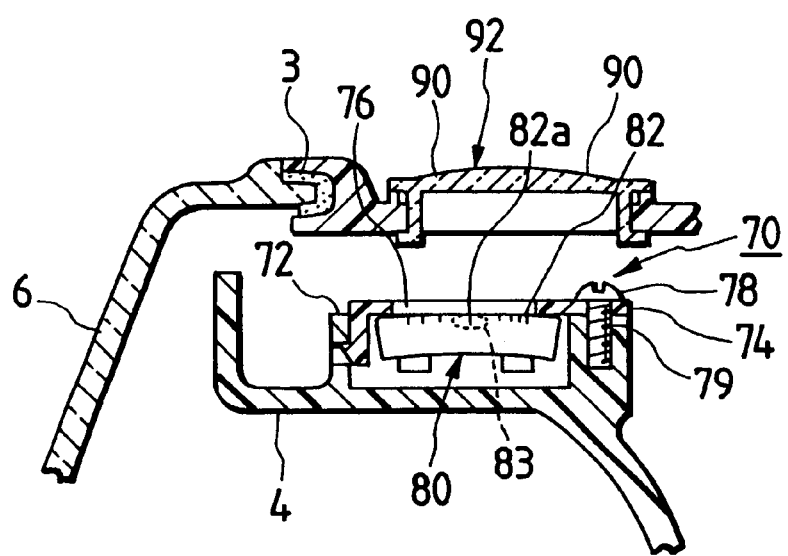
FIG. 8 is a longitudinal section view of an assembly portion of a level serving as an inclination measuring device for measuring the inclination of the headlamp in the vertical direction thereof (that is, a section view taken along the line VIII—VIII shown in FIG. 1)

FIGS. 1 to 8 shows an embodiment of a vehicle headlamp of a movable reflector type in which a reference member consists of a lamp body and an inclinable member consists of a reflector. Specifically, FIG. 1 is a front view of a vehicle headlamp of a movable reflector type according to a first embodiment of the invention, FIG. 2 is a plan view of the above headlamp, FIG. 3 is a horizontal section view of the headlamp (that is, a section view taken along the line III—III shown in FIG. 1), FIG. 4 is a longitudinal section view of the headlamp (a section view taken along the line IV—IV shown in FIG. 1), FIG. 5 is a section view of the headlamp, showing a state thereof in which an inclination measuring device for measuring the inclination of the headlamp in the right and left direction thereof is disposed at its given position (an enlarged section view taken along the line V—V shown in FIG. 1), FIG. 6 is an enlarged perspective view of the above inclination measuring device, FIG. 7 is a back view of the inclination measuring device, and FIG. 8 is a longitudinal section view of a level serving as an inclination measuring device for measuring the inclination of the headlamp in the vertical direction thereof (a section view taken along the line VIII—VIII shown in FIG. 1).

As shown in these figures, a lamp body 2 has a vessel-like shape, and in the interior portion of the lamp body 2, there is disposed a reflector 4 on which a bulb 40 serving as a light source is mounted and also, to a rectangular-shaped opening of the front surface of the lamp body 2, there is assembled a front surface lens 6. That is, these components are united together to thereby form a headlamp. Seal grooves 3 are respectively formed in the front surface opening of the lamp body 2, while the seal legs of the front surface lens 6 are engaged with the seal grooves 3. A bulb insertion hole 5 is formed in the rear top portion of the reflector 4, an opening 2a is formed in the rear top portion of the lamp body 2, and a cover 42 formed of rubber is disposed between the opening 2a and the peripheral edge portion of the bulb insertion hole 5, so that the opening 2a is closed by the cover 42.

The reflector 4, as shown in FIGS. 1, 3 and 4, is supported by an aiming mechanism composed of a ball joint 10 and aiming screws 20, 30 in such a manner that it can be inclined in the vertical direction as well as in the right and left direction. The ball portion 12 side of the ball joint 10 is supported on the lamp body 2 side, and a socket 14, in which there is formed a ball carrier for carrying the ball portion 12, of the ball joint 10 is supported by a bracket 16 which is disposed on the reflector 4 side, whereby the reflector 4 can be inclined about the ball joint 10.

Also, the aiming screws 20 and 30 are both rotatably supported by the lamp body 2 and are respectively in threaded engagement with nuts 22 and 32 which are respectively mounted on brackets 26 and 36 on the reflector 4 side; and, if the aiming screws 20 and 30 are rotated, then the nuts 22 and 32 are respectively moved back and forth along the aiming screws 20 and 30, thereby being able to change the inclination of the reflector 4. By the way, reference characters 24 and 34 designate snap rings respectively, 27 and 37 stand for O rings respectively, and 28 and 38 respectively express flange portions which are provided on and projected from the aiming screws 20 and 30. And, 21 and 31 respectively designate the rotation operation portions of the aiming screws 20 and 30 that are respectively exposed on the back surface side of the lamp body 2.

Also, the support point of the reflector 4 by the aiming screw 20 (that is, the threadedly engaged portion between the aiming screw 20 and nut 22) is situated on a horizontal axis Lx which not only intersects at right angles to the optical axis L (see FIG. 3) of the headlamp but also passes through the ball joint 10, while the support point of the reflector 4 by the aiming screw 30 (that is, the threadedly engaged portion between the aiming screw 30 and nut 32) is situated on a vertical axis Ly which not only intersects at right angles to the optical axis L of the headlamp but also passes through the ball joint 10. Owing to this structure, if the aiming screw 20 is rotated, then the reflector 4 is moved incliningly around the vertical axis Ly to thereby be able to adjust the inclination of the reflector 4 in the right and left direction thereof, that is, the inclination of the optical axis L of the headlamp in the right and left direction thereof. On the other hand, if the aiming screw 30 is rotated, then the reflector 4 is moved incliningly around the horizontal axis Lx to thereby be able to adjust the inclination of the reflector 4 in the vertical direction thereof, that is, the inclination of the optical axis L of the headlamp in the vertical direction thereof.

In this manner, by rotating the two aiming screws 20 and 30, the reflector 4 can be moved incliningly to thereby adjust the inclination of the reflector 4, that is, the inclination of the optical axis L of the headlamp can be adjusted.

In FIGS. 1 to 3 as well as 5 to 7, reference character 50 designates a first inclination measuring device which is disposed at a horizontal position containing the horizontal axis Lx therein and is used to measure the inclination of the reflector 4 in the right and left direction thereof, that is, the inclination of the optical axis L of the headlamp in the right and left direction thereof.

As shown in detail in FIGS. 5 to 7, the first inclination measuring device 50 comprises a fixed holder 52 serving as a cylindrical-shaped measuring device case which is mounted in a measuring device insertion hole 2c formed in the back surface wall of the lamp body 2 and extends in the longitudinal direction of the first inclination measuring device 50, a movable holder 56 consisting of a cylindrical-shaped zero point adjust screw which is threadedly engaged with the interior portion of the fixed holder 52 and extends in the longitudinal direction of the first inclination measuring device 50, a bar-shaped slide member 60 which is inserted into the movable holder 56 and is mounted in such a manner that it can be slided in the longitudinal direction of the first inclination measuring device 50, and a compression coil spring 64 which is stored in the interior portion of the movable holder 56 and is used to energize the slide member 60 in a direction to project from an opening 56b formed in the movable holder 56.

The fixed holder 52 is formed in a stepped pipe shape in which a front end side small diameter portion 53 and a rear end side large diameter portion 54 are so formed as to continue with each other. The fixed holder 52 is assembled in such a manner that a stepped portion 55 thereof is engaged with a recessed portion 2d so formed in the lamp body 2 as to surround the measuring device insertion hole 2c, and the front end side small diameter portion 53 thereof is inserted through the insertion hole 2c of the lamp body 2. Also, the fixed holder 52 further includes two flange portions 54a which are respectively so formed as to extend on the right and left sides of the large diameter portion 54 thereof, while the flange portions 54a are respectively fastened by screws to boss portions 51 (see FIGS. 2 and 3) which are provided on and projected from the back surface of the lamp body 2.

By the way, reference character 54c designates fastening screws, 54b stands for holes which are respectively formed in the flange portions 54a and through which the fastening screws 54c can be inserted, and 57 (see FIGS. 3 and 5) expresses a seal packing which is interposed between the recessed portion 2d of the lamp body 2 and the stepped portion 55 of the fixed holder 52 to seal the measuring device insertion hole 2c of the lamp body 2. The seal packing 57 is used to prevent water or dust from invading into the lamp body 2 through the measuring device insertion hole 2c.

Referring here in more detail to the movable holder 56 which serves as a zero point adjust screw formed of transparent synthetic resin, a male screw portion 56a formed in the outer peripheral surface of the movable holder 56 is threadedly engaged with a female screw portion 53a formed in the small diameter portion 53 of the fixed holder 52 and projects forwardly of the female screw portion 53a, while the front end portion of the movable holder 56 extends over a recessed portion 4a formed in the upper left corner portion of the reflector 4. Also, the movable holder 56 is formed in a cylindrical shape the rear end side of which is closed and, in the front end portion of the movable holder 56, there is formed an opening 56b through which the leading end portion of the slide member 60 can be projected.

In the rear end portion of the movable holder 56, there is formed a rotation operation portion 56c having a hexagonal cross section, while the rotation operation portion 56c is used as a zero point adjustment operation portion; that is, the movable holder 56 can be operated or rotated using a rotation operating tool which is designated by reference character 200 in FIG. 6. In particular, in the front end portion of the rotation operating tool 200, there is formed a hole 202 having a hexagonal cross section which can be matched to the rotation operation portion 56c and thus, if the hole 202 of the rotation operating tool 200 is engaged with the outer periphery of the rotation operation portion 56c of the movable holder 56, then the movable holder 56 can be operated or rotated using the rotation operating tool 200.

On the outer periphery of the movable holder 56 located in the neighborhood of the rear end portion thereof, there is mounted a ring-shaped bushing 58. The bushing 58 is pressed against the inner peripheral surface of the large diameter portion 54 of the fixed holder 52 to thereby be able to seal between the fixed holder 52 and movable holder 56. That is, the bushing 58 prevents water or dust from invading into the lamp body 2 through the threadedly engaged portion between the movable holder 56 and fixed holder 52.

The stepped slide member 60 is stored in the interior portion of the movable holder 56, the leading end side small diameter portion 61 of the slide member 60 is energized and projected forwardly of the movable holder 56 by the compression coil spring 64, and the leading end of the small diameter portion 61 is held in contact with a vertical wall 4c which is provided on and projected from the upper surface wall of the reflector 4. And, the slide member 60 can be slid within the movable slider 56 in linking with the inclining motion of the reflector 4 around the vertical axis Ly. The slide member 60 includes a large diameter portion 62 in the rear end side thereof. In the rear end side large diameter portion 62, there is formed a ring-shaped scale 63 in such a manner that it corresponds to a reference line 59 consisting of a ring-shaped indicator which is formed in the movable holder 56. The central graduation 63a of the scale 63 is red, whereas the other remaining graduations 63b thereof are blue. If the red central graduation 63a of the scale 63 is previously made consistent with the reference line 59 of the movable holder 56 (which is hereinafter referred to as a zero point adjustment), then the degree of the inclination of the reflector 4 in the right and left direction thereof can be read from the displacement of the scale 63.

By the way, the graduations of the scale 63 can be read through a peep window 90 formed in the lamp body 2. That is, at the position of the upper surface wall of the lamp body 2 that corresponds to the inclination measuring device 50, there is formed an opening and, on the opening of the lamp body 2, there is mounted a transparent cap 92 which is formed of synthetic resin and has a convex lens structure.

And, the scale or graduations of the inclination measuring device 50 can be seen in an enlarged manner by the peep window 90 (cap 92), which makes it convenient to read the scale 63. Here, reference character 94 designates a seal ring which is used to secure a sealed condition in the cap 92 mounting portion of the lamp body 2.

Also, the zero point adjustment of the scale 63 is made by the movable holder 56 serving as a zero point adjust screw. That is, if the movable holder 56 is rotated, then the movable holder 56 is moved back and forth with respect to the fixed holder 52 which is fixed to the lamp body 2. And, since the slide member 60 is pressed by the compression coil spring 64 and the leading end portion thereof is thereby held in contact with the reflector 4 (in more particular, the vertical wall 4c of the reflector 4), the movable holder 56 is slided back and forth with respect to the slide member 60, so that the reference line 59 of the movable holder 56 slides along the scale 63 of the slide member 60. Thanks to this, when the inclination of the reflector 4 in the right and left direction thereof is proper, the zero point adjustment of the scale 63 of the inclination measuring device 50 can be made simply by means of the rotational operation of the movable holder 56.

Also, when the reflector 4 is inciningly moved around the vertical axis Ly for some reason or other and the position of the reflector 4 around the vertical axis Ly is thereby changed after the zero point adjustment is completed, that is, when the inclination of the optical axis L of the headlamp is changed, the amount of inclining motion of the reflector 4 appears in the form of the displacement of the graduation of the inclination measuring device 50 (that is, displacement between the central graduation 63a and reference line 59), so that the amount of inclination of the optical axis L of the headlamp in the right and left direction thereof can be confirmed immediately. And, in such case, the inclination adjustment of the reflector 4 may be made by rotating the aiming screw 20 in such a manner as to remove the displacement of the scale 63 of the inclination measuring device 50.

By the way, the slide member leading end portion contact surface $4c_1$ of the vertical wall 4c of the reflector 4 is formed as a curved surface which has a radius R with the horizontal axis Lx as the center thereof, while the position of the slide member 60 in the back-and-forth direction thereof, that is, the scale of the first inclination measuring device 50 cannot be changed by the inclining motion of the reflector 4 in the vertical direction thereof (that is, the inclining motion of the reflector 4 around the horizontal axis Lx).

Also, in the large diameter portion 54 located in the rear end portion of the fixed holder 52 which serves as a measuring device case, there is formed a tongue-shaped extension portion 150 (which is composed of an upper extension portion 151 and a lower extension portion 152) having an arc-shaped cross section; in particular, the extension portion 150 is a vertical wall which extends upwardly and downwardly of the rotation operation portion 56c located in the rear end portion of the movable holder 56 as well as in parallel to the movable holder 56. And, a cap 160A, which is used as a rotation operation portion hide member, is mounted on the extension portion 150 (upper extension portion 151 and lower extension portion 152), thereby being able to cover or hide the rotation operation portion 56c of the movable holder 56.

In particular, the extension portion 150 is composed of a pair of mutually opposing upper and lower tongue-shaped extension portions 151 and 152 which are formed by cutting away the right and left side wall areas of a cylindrical body perpendicularly in a mutually opposing manner. When the first inclination measuring device 50 is viewed from the back surface side thereof, as shown in FIG. 7, the present extension portion 150 shows an oval shape long from top to bottom. That is, when compared with a cylindrical extension portion, since the hole 54b for insertion of the fastening screw can be disposed near the extension portion 150, the extension length D of the flange portion 54a of the large diameter portion 54 of the fixed holder 52 can be reduced and thus, when the first inclination measuring device 50 is mounted onto and fixed to the lamp body 50, the flange portion 54a is more difficult to interfere with other components by an amount corresponding to the reduced amount of the extension length D.

Also, the upper and lower extension portions 151 and 152 respectively extend backwardly so that they are flexible in the vertical direction. Therefore, by making use of the flexibility of the upper and lower extension portions 151 and 152, the cap 160A can be mounted smoothly onto the extension portion 150 (upper and lower extension portions 151 and 152).

On the other hand, the cap 160A is so formed as to have a size which allows the cap 160A to be mounted on the outer periphery of the extension portion 150 (upper and lower extension portions 151 and 152) in almost close contact therewith. In more particular, the cap upper surface wall 162 and cap lower surface wall 163 of the cap 160A are respectively formed in such a manner that they have arc-shaped cross sections which allow them to be matched to the outer peripheries of the upper and lower extension portions 151 and 152, while the left and right side surface walls 164, 165 and back surface wall 166 of the cap 160A are respectively formed in flat surfaces which can close the side openings of the extension portion 150 (upper and lower extension portions 151 and 152). Thanks to this, if the cap 160A is mounted on the extension portion 150 (upper and lower extension portions 151 and 152), then the cap upper surface wall 162 is engaged with the upper extension portion 151 and the cap lower surface wall 163 is engaged with the lower extension portion 152. That is, the cap 160A is mounted on the extension portion 150 in such a manner that it is prevented against rotation around the extension portion 150.

Also, in each of the cap upper surface wall 162 and cap lower surface wall 163 of the cap 160A, there are disposed a pair of right and left securing pawls 168 which are surrounded by their associated U-shaped slits 167 and extend inwardly and backwardly while they are inclined. And, if the cap 160A is mounted on the extension portion 150, then the securing pawls 168 are elastically engaged with hooks 151a, 152a which are respectively disposed on the leading end portion of the extension portion 150 (upper and lower extension portions 151 and 152), thereby preventing the cap 160A against removal from the extension portion 150.

In other words, if the cap 160A is pushed in from the leading end portion of the extension portion 150, then the securing pawls 168 pressed by the hooks 151a, 152a on the leading end portion of the extension portion 150 (upper and lower extension portions 151 and 152) are elastically deformed outwardly of the cap upper and lower surface walls 162 and 163 within the slits 167. Due to this, not only the cap 160A can be mounted onto the extension portion 150 smoothly but also the securing pawls 168 are elastically engaged with the stepped portions of the hooks 151a and 152a, whereby the cap 160A can be fixed to the extension portion 150 in such a manner that it is prevented against removal from the extension portion 150.

Also, inside the back surface wall 166 of the cap 160A, there is provided a cylindrical-pillar-shaped engaging projection 170 which, when the cap 160A is mounted onto the extension portion 150, is able to prevent the rotation operation portion 56c of the movable holder 56 against rotation. That is, on the outer peripheral surface of the engaging projection 170, there is formed a male serration 172; and, on the other hand, in the rotation operation portion 56c, there is formed a round hole 174 into which the engaging projection 170 can be engaged, and, on the inner peripheral surface of the round hole 174, there is formed a female serration 176 which can be matched to the male serration 172 of the engaging projection 170. And, at the same time when the cap 160A is mounted onto the extension portion 150, the engaging projection 170 is serration fitted into the round hole 174, so that the movable holder 56 consisting of a zero point adjust screw is prevented against rotation with respect to the cap 160A which is prevented against removal and rotation with respect to the extension portion 150.

In FIGS. 1 to 3 and 8, reference character 70 designates a level serving as a second inclination measuring device which is used to measure the inclination of the reflector 4 in the vertical direction thereof, that is, the inclination of the optical axis L of the headlamp in the vertical direction thereof. The level 70 comprises a level casing 72 which is formed integrally with the upper surface wall of the reflector 40, and a bubble tube 80 of a linear type which is mounted on and united together with the back side of a cover member 74 in such a manner that the bubble tube 80 is stored in the interior portion of the level casing 72. In the cover member 74, there is formed an opening 76 through which the scale forming position of the bubble tube 80 is exposed. By the way, reference character 82 designates the scale of the bubble tube 80, 82a stands for the zero point position of the scale 82, and 83 expresses an air bubble. And, the bubble tube 80 is arranged in the interior portion of the level casing 72 in such a manner that the scale 82 thereof intersects at right angles to the horizontal axis Lx and, therefore, if the air bubble 83 is previously adjusted to the scale zero point position 82a, then the inclination of the reflector 4 around the horizontal axis Lx is to appear as the displacement of the air bubble 83 with respect to the scale zero point position 82a. Also, reference character 78 designates a zero point adjust screw, while the cover member 74 is fixed by the zero point adjust screw 78 through a plate spring 79. And, by inserting a tool such as a driver or the like from the opening constituting the peep window 90 formed upwardly of the level 70 and rotating the zero point adjust screw 78 by the tool, the position of the air bubble 83 within the bubble tube 80 can be adjusted, that is, the zero point adjustment takes place.

Also, through the transparent peep window 90 formed at such position of the upper surface wall of the lamp body 2 that corresponds to the level 70, the scale of the level 70 can be read, that is, the amount of inclination of the reflector 4 in the vertical direction thereof can be read.

Next, description will be given below of not only the procedure for such adjustment of the inclination measuring devices 50 and 70 that is made when the headlamp is assembled to the vehicle body but also the procedure for such headlamp optical axis adjustment that is executed after the above adjustment.

Here, as a single part, the headlamp is structured in the following manner: that is, when the central graduation 63a of the scale 63 of the slide member 60 of the first inclination measuring device 50 is coincident with the position of the reference line 59, the light distribution characteristic of the headlamp in the right and left direction thereof provides a proper position (that is, the optical axis L of the headlamp provides a proper position in the right and left direction thereof); and, when the air bubble 83 of the level 70 serving as the second inclination measuring device lies at the zero point position 82a of the linear scale 82, the light distribution characteristic of the headlamp in the vertical direction thereof provides a proper position (that is, the optical axis L of the headlamp provides a proper position in the vertical direction thereof).

And, when the headlamp incorporating therein the first and second inclination measuring devices 50 and 70 is assembled to the vehicle body, the scale displays of the respective inclination measuring devices do not provide the proper positions due to various errors. Therefore, it is necessary that the scales of the first and second inclination measuring devices 50 and 70 have been zero-point adjusted previously to their proper conditions.

Next, description will be given below of an embodiment of this zero point adjusting method.

That is, the vehicle is situated in a horizontal place, a light distribution screen is set at a given position in front of the vehicle, and the headlamp is turned on. And, the aiming screws 20 and 30 are operated or rotated to thereby adjust the headlamp so that the light distribution thereof can be set at a given position of the light distribution screen in the right and left direction thereof (that is, the optical axis L of the headlamp can be made coincident with the axle). However, in this operation, because of variations in the lamp mounting surface of the vehicle body or the like, there are possibilities that the position of the reference line 59 cannot be coincident with the central graduation 63a of the scale 63 of the first inclination measuring device 50 and also that the air bubble 83 position cannot be coincident with the zero point position 82a of the scale 82. Therefore, in the first inclination measuring device 50, the movable holder 56 serving as a zero point adjust screw is operated or rotated to move the movable holder 56 (reference line 59) back and forth in the axial direction thereof, thereby making a zero point adjustment, that is, the central graduation 63a of the first inclination measuring device 50 is made to coincide with the reference line 59. Also, in the level 70 which is used as the second inclination measuring device, the zero point adjust screw 78 is operated or rotated to thereby make a zero point adjustment, that is, the air bubble 83 is set at the zero point position 82a of the scale 82.

In other words, the headlamp is adjusted in such a manner that, when the optical axis L of the headlamp is set at a proper position in the right and left direction as well as in the vertical direction, not only the position of the reference line 59 of the first inclination measuring device 50 is to display the scale zero point (namely, the central graduation 63a) but also the air bubble 83 of the level 70 serving as the second inclination measuring device is to display the zero point 82a of the scale 82.

And, the cap 160A is mounted onto the rear extension portion 150 (151, 152) of the fixed holder 52 to thereby hide the rotation operation portion 56c, so that the rotation operation portion 56c cannot be operated or rotated (that is, the zero point adjustment cannot be made) on the user side.

After then, as the need arises, the aiming adjustment is made on the user side. That is, the user peeps into the headlamp through the peep window 90 and, if the reference line 59 of the first inclination measuring device 50 does not indicate the central graduation 63a of the scale 63 of the first inclination measuring device 50, or if the air bubble 83 position is displaced from the zero point position 82a of the scale 82, then the user is able to read the displacement of the optical axis L in the right and left direction as well as in the vertical direction from the thus obtained displacements of the reference line 59 and air bubble 83.

Also, when the optical axis L is displaced in the right and left direction as well as in the vertical direction, the aiming screw 20 or 30 may be operated or rotated to thereby adjust the first and second inclination measuring devices 50 and 70 so that, in the first inclination measuring device 50, the central graduation 63a of the scale 63 is to be coincident with the position of the reference line 59 and, in the level 70 serving as the second inclination measuring device, the air bubble 83 is to be coincident with the zero point position 82a of the scale 82. In this manner, the optical axis L can be adjusted to its proper position in the right and left direction as well as in the vertical direction.

In the present embodiment, when putting the vehicle such as an automobile onto the market, after completion of the aiming adjustment of the headlamp, the rotation operation portion 56c, which is the zero point adjustment operation portion of the first inclination measuring device 50 that has been zero point adjusted, is covered or hidden by the cap 160A to thereby completely prevent the same from being exposed to the outside. Thanks to this, there is no fear that the rotation operation portion 50c can be operated in error on the user side. Therefore, there is no fear that the zero point of the first inclination measuring device 50 can be out of order. This always makes it possible not only to detect accurately the displacement of the optical axis L of the headlamp in the right and left direction but also to make an accurate aiming adjustment.

By the way, in the above-mentioned embodiment, the engaging projection 170 of the cap 160A and the round hole 174 of the rotation operation portion 56c are serration fitted with each other, whereby the movable holder 56 serving as a zero point adjust screw and the fixed holder 52 serving as a measuring device case can be fixed in the peripheral direction thereof by the cap 160A. However, this structure is not always limitative. That is, the engaging projection 170 of the cap 160A and the round hole 174 of the rotation operation portion 56c are not always necessary. According to the invention, there can be employed another structure, provided that a cap can be mounted on the rear extension portion 150 of the fixed holder 52 to thereby be able to cover or hide the rotation operation portion 56c of the movable holder 56.

Figure 9:
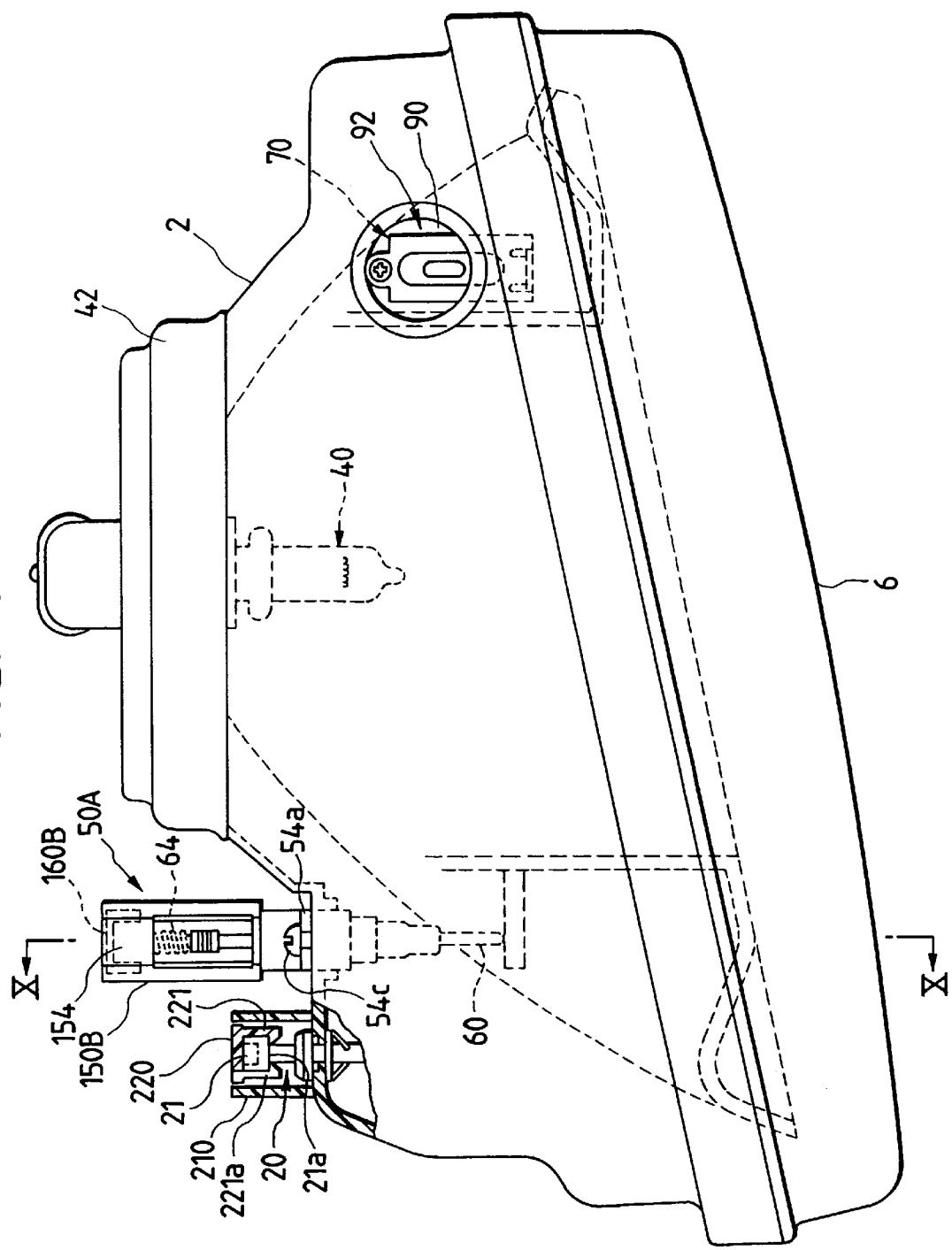
FIG. 9 is a plan view of a headlamp of a movable reflector type according to a second embodiment of the invention.
Figure 10:
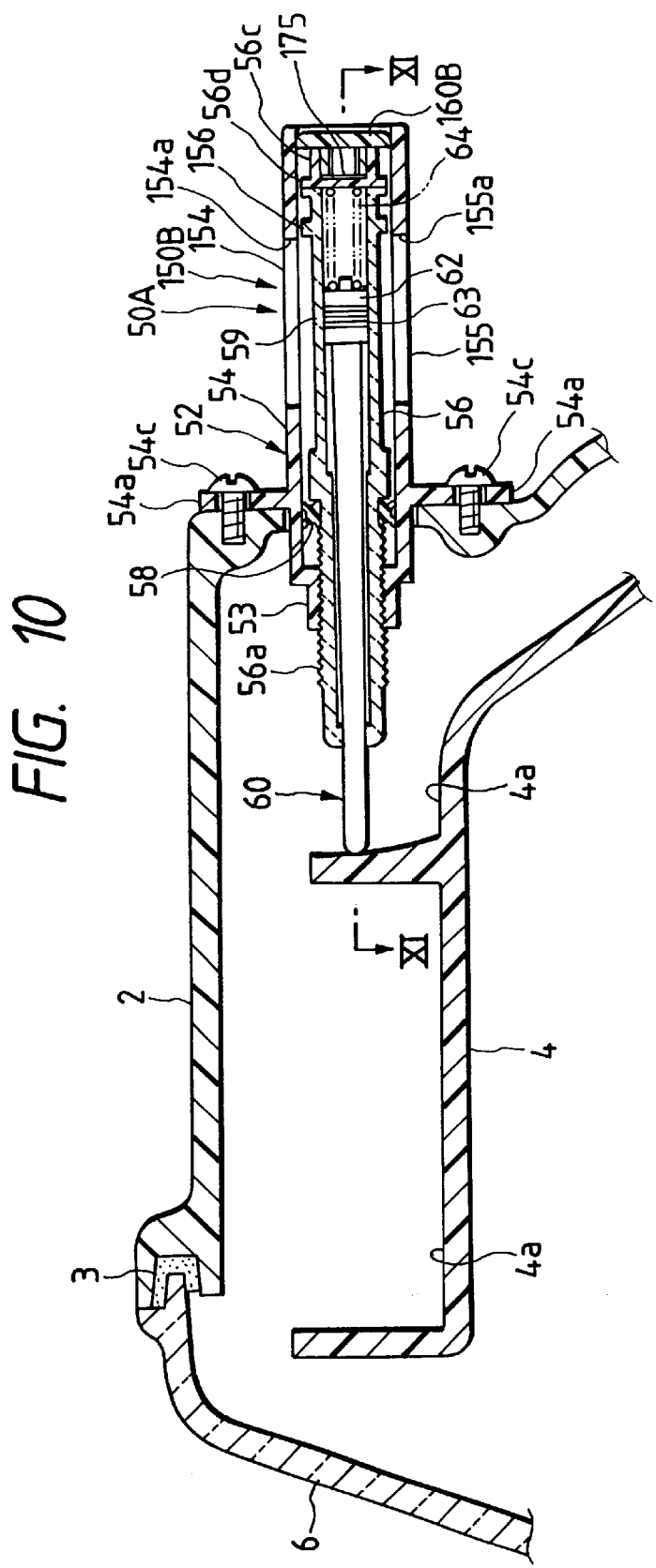
FIG. 10 is a longitudinal section view of the above headlamp, showing a state thereof in which an inclination measuring device for measuring the inclination of the optical axis of the headlamp is disposed at its given position (that is, a section view taken along the line X—X shown in FIG. 9)
Figure 11:
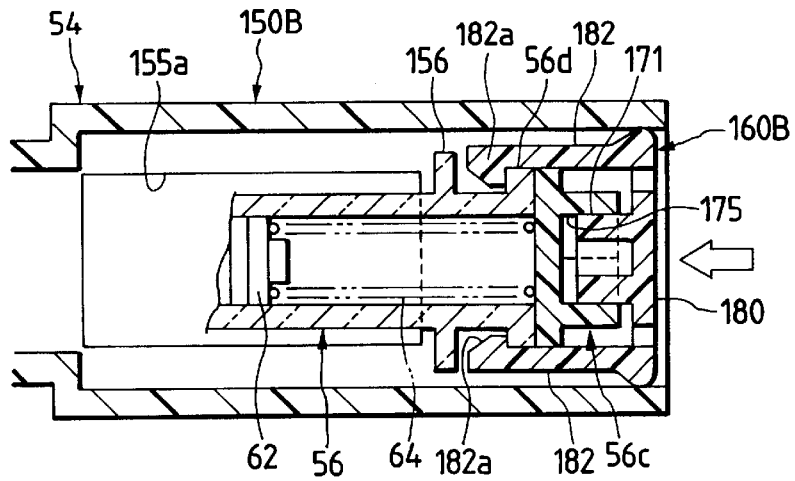
FIG. 11 is a horizontal section view of the periphery of the rotation operation portion of a zero point adjust screw, showing a state thereof in which a cap is mounted thereon (that is, a section view taken along the line XI—XI shown in FIG. 9)
Figure 12:
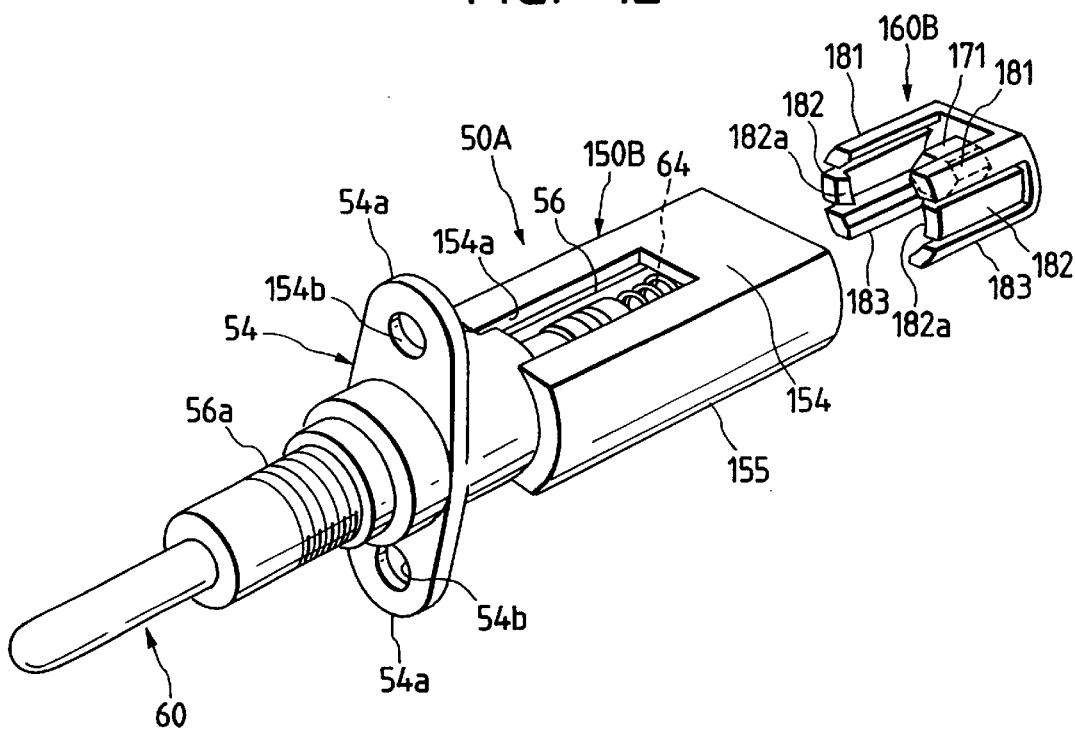
FIG. 12 is a perspective view of the above inclination measuring device.

Now, FIGS. 9 to 12 shows a second embodiment of a headlamp of a movable reflector type according to the invention. In particular, FIG. 9 is a plan view of a headlamp according to the second embodiment of the invention, FIG. 10 is a longitudinal section view of the headlamp (that is, a section view thereof taken along the line X—X shown in FIG. 9), showing a state thereof in which an inclination measuring device for measuring the inclination of the optical axis of the headlamp in the right and left direction thereof is disposed in its given position, FIG. 11 is a horizontal section view of the headlamp (that is, a section view thereof taken along the line XI—XI shown in FIG. 10), showing the periphery of a rotation operation portion thereof used to operate a zero point screw when a cap is mounted on the rotation operation portion, and FIG. 12 is a perspective view of the above inclination measuring device.

As has been described previously, in the first embodiment of the invention, the scale display portion (which is composed of the reference line 59 and scale 63) of the inclination measuring device 50 is disposed in front of the flange portion 54a of the fixed holder 52 serving as a measuring device case, that is, the scale display portion is disposed in the interior portion of the lamp body 2, which makes it difficult to read the scale from the outside. On the other hand, in the second embodiment, the scale display portion (which is composed of the standard line 59 and scale 63) of an inclination measuring device 50A is disposed in the rear of the flange portion 54a of the fixed holder 52, that is, the scale display portion is disposed on the exterior portion of the lamp body 2, which makes it easy to read the scale from the outside.

In other words, in the rear of the large diameter portion 54 of the fixed holder 52, there is formed a cylindrical-shaped extension portion 150B which consists of a vertical wall; in the interior portion of the extension portion 150B, there is disposed a movable holder 56 which consists of a zero point,adjust screw; and, in the interior portion of the movable holder 56, there is stored a slide member 60 which is energized forwardly by a spring.

The extension portion 150B is formed in a substantially oval-shaped cylindrical body having a cross section which is long from side to side; and, in the cylindrical-shaped extension portion 150B, the mutually opposing upper and lower side walls 154 and 155 thereof are formed of mutually parallel plane walls. And, the flange portion 54a of the extension portion 150B, which is used to mount and fix the inclination measuring device 50A onto the lamp body 2, extends upwardly and downwardly of the fixed holder 52 and, similarly to the first embodiment, the whole length of the flange portion 54a is set short, so that, when the inclination measuring device 50A is mounted on and fixed to the lamp body 2, the flange portion 54a is hard to interfere with other components. Also, the upward and downward extension of the flange portion 54a can narrow the mounting space of the inclination measuring device 50A in the right and left direction thereof, which makes it possible to mount the inclination measuring device 50A onto the lamp body 2 without interfering with not only an aiming screw 20 for inclining and adjusting the optical axis L of the headlamp in the right and left direction but also the curved portion of the lamp body 2.

Also, in the mutually opposing upper and lower plane walls 154 and 155, there are formed rectangular-shaped openings 154a and 155a which are mutually opposed in the vertical direction; and, the openings 154a and 155a not only allow the scale portion of the slide member 60 to be exposed but also serve as holes used to discharge water and refuse which have invaded into the interior portion of the extension portion 150B of the fixed holder 52.

On the rotation operation portion 56c of the movable holder 56, there is mounted a cap 160B which can be inserted into the rear end opening of the extension portion 150B, so that the rotation operation portion 56c is covered or hidden by the cap 160B.

The cap 160B comprises a substantially oval-shaped bottom surface wall 180 and two right and left side walls which respectively extend from the bottom surface wall 180 at right angles thereto. The right and left side walls of the cap 160B are respectively composed of three elastic hold pieces 181, 182 and 183 which respectively extend forwardly in such a manner that they can be contacted with the outer peripheral edge of an increased diameter portion formed in the outer periphery of the rotation operation portion 56c. And, in the respective leading end portions of the elastic hold pieces 182 which are located in the respective central portions of the right and left side walls in the vertical direction thereof, there are formed hooks 182a which can be engaged with the stepped portion of the increased diameter portion 56d of the rotation operation portion 56c.

Also, on the bottom surface wall 180 of the cap 160B, there is provided an engaging projection 171 having a hexagonal-shaped cross section which can be engaged with a hole 175 formed in the rotation operation portion 56c and having a hexagonal-shaped cross section. And, if the cap 160B is pushed into the extension portion 150B in such a manner that the right and left side walls thereof are engaged with the rear end opening of the extension portion 150B, then the elastic hold pieces 181, 182 and 183 are elastically deformed to thereby move beyond the increased diameter portion 56d of the rotation operation portion 56c, so that the hooks 182a of the elastic hold pieces 182 are engaged with the increased diameter portion 56d to thereby prevent the cap 160B against removal from the extension portion 150B; and, at the same time, the cap 160B is completely stored within the rear end opening of the extension portion 150B. Also, at the same time when the cap 160B is mounted onto the rotation operation portion 56c, the hexagonal-shaped engaging projection 171 of the cap 160B is engaged with the hexagonal-shaped hole 175 of the rotation operation portion 56c, so that the rotation operation portion 56c (and thus the movable holder 56 serving as a zero point adjust screw) is prevented against rotation with respect to the extension portion 150B serving as a measuring device case through the cap 160B.

And, at a position adjacent to the increased diameter portion 56d of the rotation operation portion 56c of the movable holder 56, there is formed a flange portion 156 (see FIGS. 10 and 11) which is used to narrow a gap between the movable holder 56 and extension portion 150B. The flange portion 156 is formed at a position which is not exposed to the interior portions of the openings 154a and 155a of the extension portion 150B, and the flange portion 156 acts as an obstacle to prevent the invasion of a driver which is inserted from the openings 154a and 155a in order to remove the engagement of the hooks 182a with respect to the increased diameter portion 56d.

Therefore, in the present embodiment as well, when putting the vehicle onto the market, after completion of the aiming adjustment of the headlamp, the rotation operation portion 56c serving as a zero point adjustment operation portion in the zero-adjusted inclination measuring device 50A is covered by the cap 160B to thereby prevent the rotation operation portion 56c completely from being exposed to the outside, which eliminates the fear that the rotation operation portion 56c can be operated in error on the user side. Also, since it is quite difficult to remove the cap 160B on the user side, the zero point of the inclination measuring device 50A can never be out of order, so that the accurate displacement of the optical axis L of the headlamp can be always detected and the accurate aiming adjustment of the headlamp can be made using the thus structured inclination measuring device 50A.

Also, the rotation operation portions 21 and 31 (although the rotation operation portion 21 is shown, the rotation operation portion 31 is not shown) of the aiming screws 20 and 30, which respectively project backwardly of the lamp body 2, are surrounded by a cylindrical-shaped vertical wall 210 which is formed integrally with the lamp body 2. And, if a cap 220 is mounted on the rotation operation portions 21 and 31 and is then inserted into the vertical wall 210, then the rotation operation portions 21 and 31 of the aiming screws 20 and 30 can be covered or hidden from the outside.

That is, the peripheral wall of the cap 220 is formed in a cylindrical shape which can be engaged into the vertical wall 210. In the peripheral wall of the cap 220, in more particular, at three positions in the peripheral direction thereof, there are formed three vertical slits 221a; and thus, the peripheral wall of the cap 220 is composed of three elastic hold pieces 221 each having an arc-shaped cross section. Here, reference character 221b designates a hook which is formed in the leading end portion of each elastic hold piece 221. And, if the cap 220 is inserted into the vertical wall 210 in such a manner that the peripheral wall (three elastic hold pieces 221) of the cap 220 is placed over the rotation operation portions 21 and 31, then the cap 220 can be mounted simply on the rotation operation portions 21 and 31. That is, if the cap 220 is pushed into the vertical wall 210 with the peripheral wall of the cap 220 engaged with the interior portion of the vertical wall 210, then the elastic hold pieces 221 are respectively engaged with the stepped portions 21a and 31a (not shown) of the rotation operation portions 21 and 31, so that the cap 220 is prevented against removal from the vertical wall 210.

The remaining portions of the second embodiment are the same as those of the first embodiment and, therefore, the same reference characters are given to them and the description thereof is omitted here.

As has been described above, according to the second embodiment, it is also possible to employ a structure in which not only the zero point adjustment operation portion of the inclination measuring device 50A but also the rotation operation portions 21 and 31 of the aiming screws 20 and 30 are covered and thus not exposed to the outside. And, when the zero point adjustment operation portion (rotation operation portion 56c) of the inclination measuring device 50A as well as the rotation operation portions (21 and 31) of the aiming screws 20 and 30 are covered and hidden from the outside, after the headlamp is aiming adjusted and the vehicle is put onto the market, since not only the zero point adjustment of the inclination measuring device 50A but also the aiming adjustment of the headlamp cannot be made on the user side, on the user side, only the detection of the displacement of the optical axis L of the headlamp in the right and left direction by the inclination measuring device 50A is possible.

Figure 13:
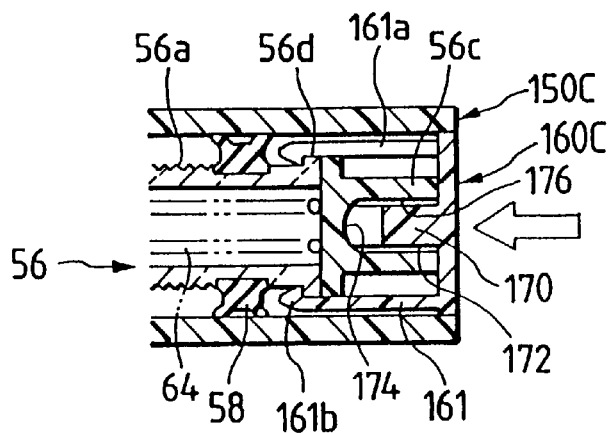
FIG. 13 is a section view of the main portions of a headlamp according to a third embodiment of the invention.

Now, FIG. 13 is a section view of the rear end portion periphery of a zero point adjust screw which is a main portion of a third embodiment of a headlamp according to the invention.

In the previously described first embodiment, the rear extension portion 150 consisting of the vertical wall formed in the fixed holder 52 is formed in a tongue-like shape. On the other hand, in the third embodiment, the rear extension portion 150C of the fixed holder 52 is formed in a cylindrical shape. And, the rear extension portion 150C is formed in such a manner that it extends sufficiently up to a position which surrounds the rotation operation portion 56c of the movable holder 56 serving as the zero point adjust screw. Also, a cap 160C, which is mounted on the rotation operation portion 56c, is stored in the interior portion of the rear extension portion 150C.

The peripheral wall of the cap 160C is formed in a cylindrical shape which can be engaged with the interior portion of the rear extension portion 150C. And, in the peripheral wall of the cap 160C, in more particular, at three positions in the peripheral direction thereof, there are formed three vertical slits 161a; and thus, the peripheral wall of the cap 160C is composed of three elastic hold pieces 161 each of which has an arc-shaped cross section. Here, reference character 161b designates a hook which is formed in the leading end portion of each elastic hold piece 161.

And, if the cap 160C is inserted into the rear extension portion 150C in such a manner that the peripheral wall (three elastic hold pieces 161) of the cap 160C is placed over the rotation operation portion 56c, then the cap 160C can be mounted simply on the rotation operation portion 56c. That is, if the cap 160C is pushed into the rear extension portion 150C with the peripheral wall of the cap 160C engaged with the interior portion of the rear extension portion 150C, then the elastic hold pieces 161 are moved beyond and engaged with the increased diameter portion 56d of the outer periphery of the rotation operation portion 56c, so that the cap 160C is prevented against removal from the rear extension portion 150C.

The remaining portions of the third embodiment are the same as those of the first embodiment and, therefore, the same reference characters are given to them and the description thereof is omitted here.

Figure 14:
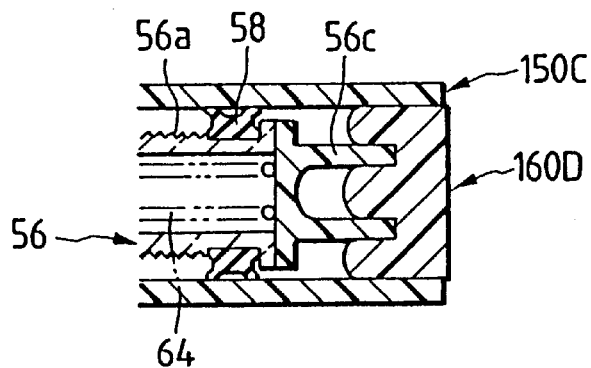
FIG. 14 is a section view of the main portions of a headlamp according to a fourth embodiment of the invention.

Now, FIG. 14 is a section view of the rear end portion periphery of a zero point adjust screw which is a main portion of a fourth embodiment of a headlamp according to the invention.

In the fourth embodiment, the rear extension portion 150C of the fixed holder 52 is formed in a cylindrical shape. And, the rear extension portion 150C is formed in such a manner that it extends sufficiently up to a position which surrounds the rotation operation portion 56c of the movable holder 56 serving as the zero point adjust screw. In particular, a soft filler member 160D, which is formed of soft material such as silicone or the like, is pressed into the rear extension portion 150C from the end portion of an opening formed therein, that is, the filler member 160D is charged into the rear extension portion 150C from a gap between the rotation operation portion 56c and rear extension portion 150C in such a manner that the filler member 160D can surround the end portion of the opening of the rear extension portion 150C, and, after then, the filler member 160D is dried and hardened.

Figure 15:
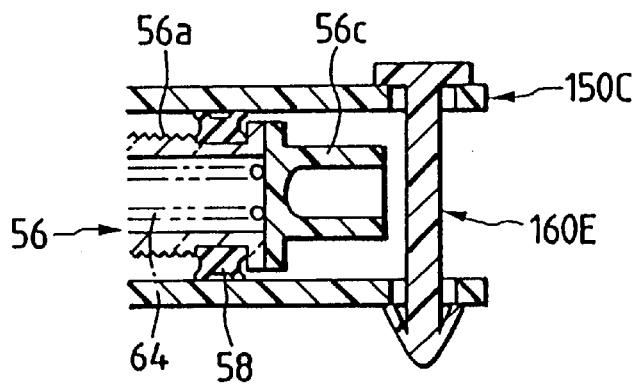
FIG. 15 is a section view of the main portions of a headlamp according to a fifth embodiment of the invention.

Now, FIG. 15 is a section view of the rear end portion periphery of a zero point adjust screw which is a main portion of a fifth embodiment of a headlamp according to the invention.

In the fifth embodiment, the rear extension portion 150C of the fixed holder 52 is formed in a cylindrical shape. And, the rear extension portion 150C is formed in such a manner that it extends up to a position sufficiently beyond a rotation operation portion 56c formed in the rear end portion of the movable holder 56 serving as the zero point adjust screw. And, a plate 160E is mounted on the rear extension portion 150C in such a manner that the plate 160E extends through the rear extension portion 150C and closes the end portion of the opening of the rear extension portion 150C to thereby be able to hide the rotation operation portion 56c from the outside.

Figure 16:
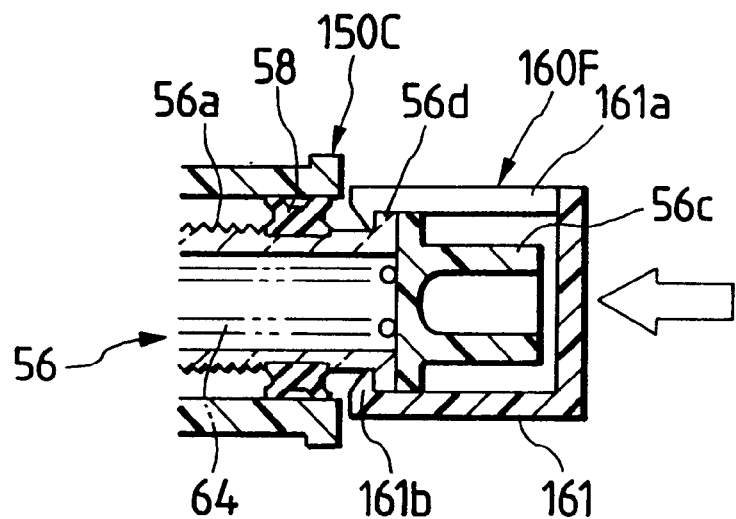
FIG. 16 is a section view of the main portions of a headlamp according to a sixth embodiment of the invention.
Figure 17:
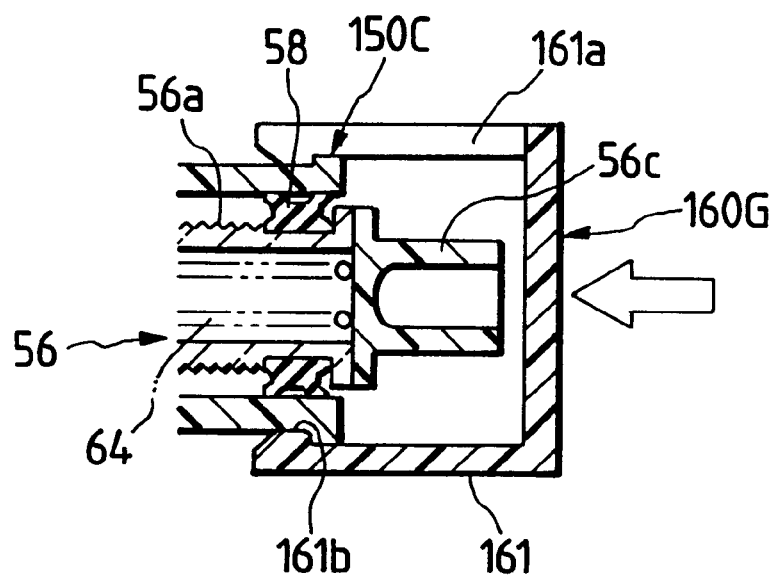
FIG. 17 is a section view of the main portions of a headlamp according to a seventh embodiment of the invention.

Now, FIGS. 16 and 17 are respectively section views of the rear end portion peripheries of zero point adjust screws which are respectively main portions of sixth and seventh embodiments of a headlamp according to the invention.

In these two embodiments, the rotation operation portion 56c formed in the rear end portion of the movable holder 56 consisting of the zero point adjust screw projects outwardly from the opening end portion of the cylindrical-shaped rear extension portion 150C. In the sixth embodiment (FIG. 16), a cap 160F is mounted directly on the rotation operation portion 56c, and also the cap 160F is structured such that it can be rotated idly with respect to the rotation operation portion 56c. On the other hand, in the seventh embodiment (FIG. 17), a cap 160G is mounted on the opening end portion of the rear extension portion 150C, and also the cap 160G is structured such that it can be rotated idly with respect to the rear extension portion 150C.

That is, the inside diameters of the peripheral walls of the caps 160F and 160G are formed slightly larger than the outside diameter of the rear extension portion 150C; and, in the leading end side of the respective peripheral walls, in more particular, at three positions thereof which are spaced apart from each other by an equal distance in the peripheral direction thereof, there are formed three vertical slits 161a, and, therefore, substantially similarly to the cap 160C (see FIG. 13) employed in the third embodiment of the invention, the respective peripheral walls of the caps 160F and 160G are composed of three elastic hold pieces 161 each having an arc-shaped cross section. And, if the caps 160F and 160G are pushed into the rear extension portion 150C in the direction of outline arrows shown in FIGS. 16 and 17, then the peripheral walls (elastic hold pieces 161) of the caps 160F and 160G are elastically deformed in the outward direction to thereby be able to mount the caps 160F and 160G on the rotation operation portion 56c and on the end portion of the opening of the rear extension portion 150C in an idly rotatable manner.

Figure 18:
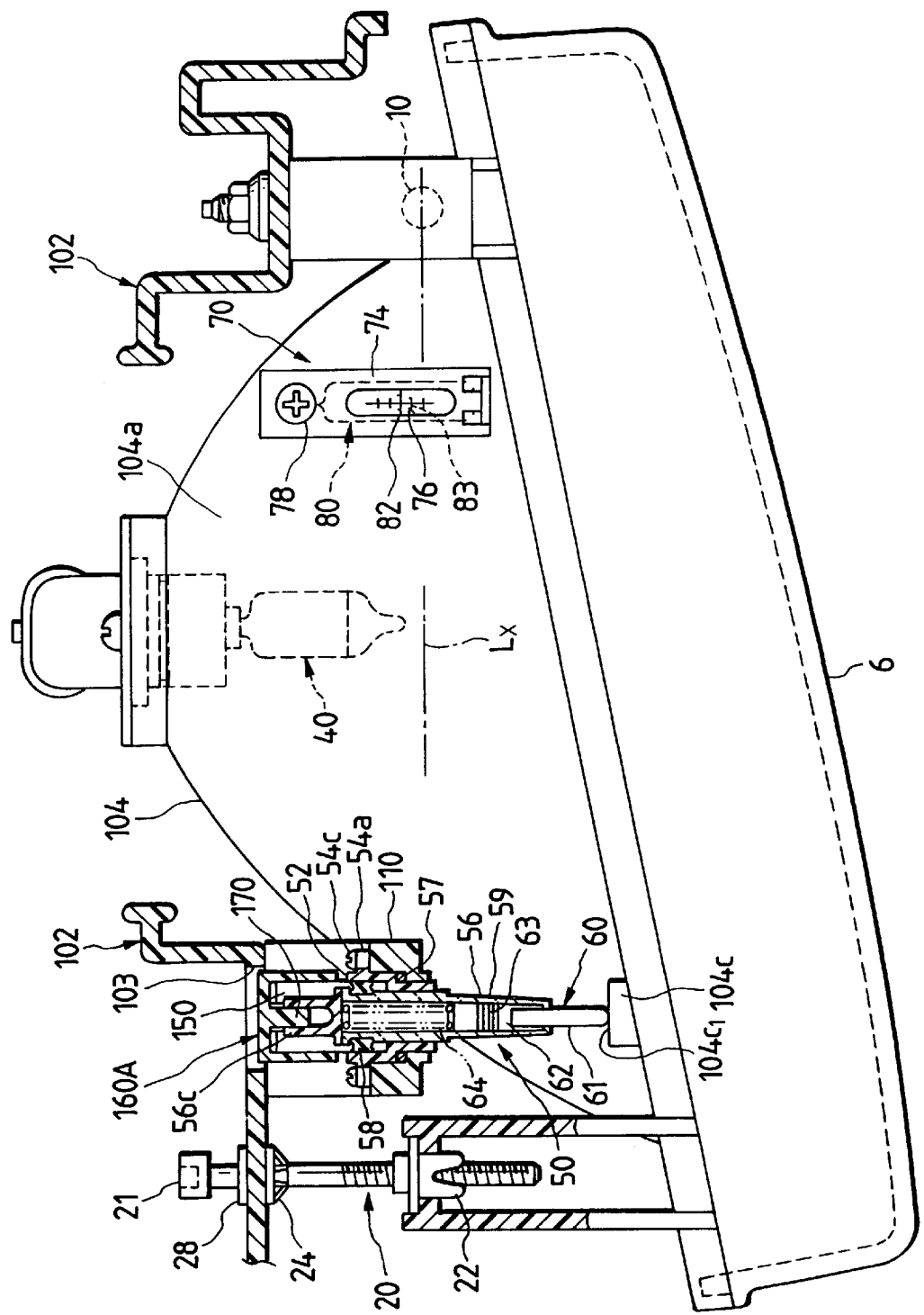
FIG. 18 is a plan view of a headlamp of a movable unit type according to an eighth embodiment of the invention.
Figure 19:
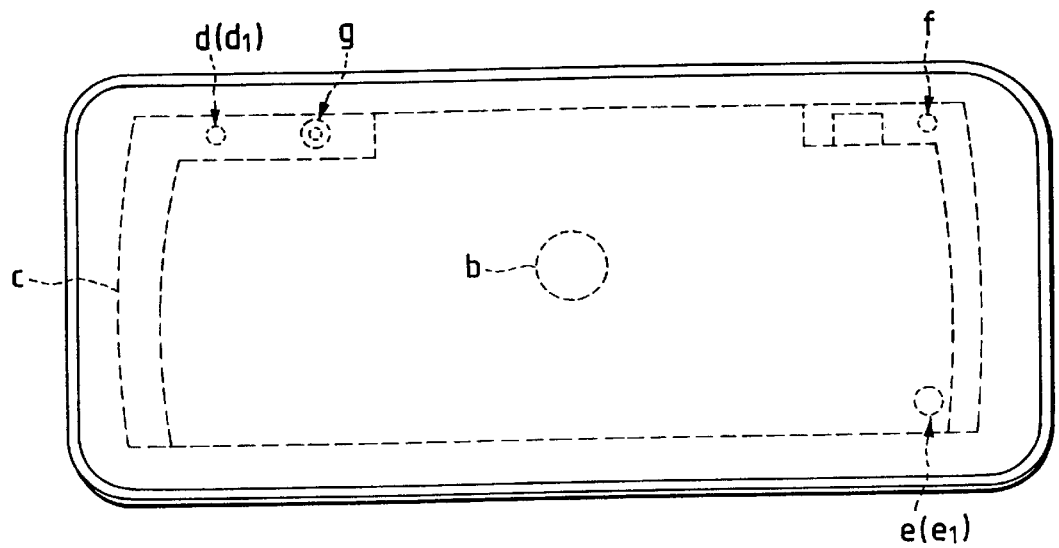
FIG. 19 is a front view of a conventional headlamp of a movable reflector type; and, FIG. 20 is a horizontal section view of the conventional headlamp.
Figure 20:
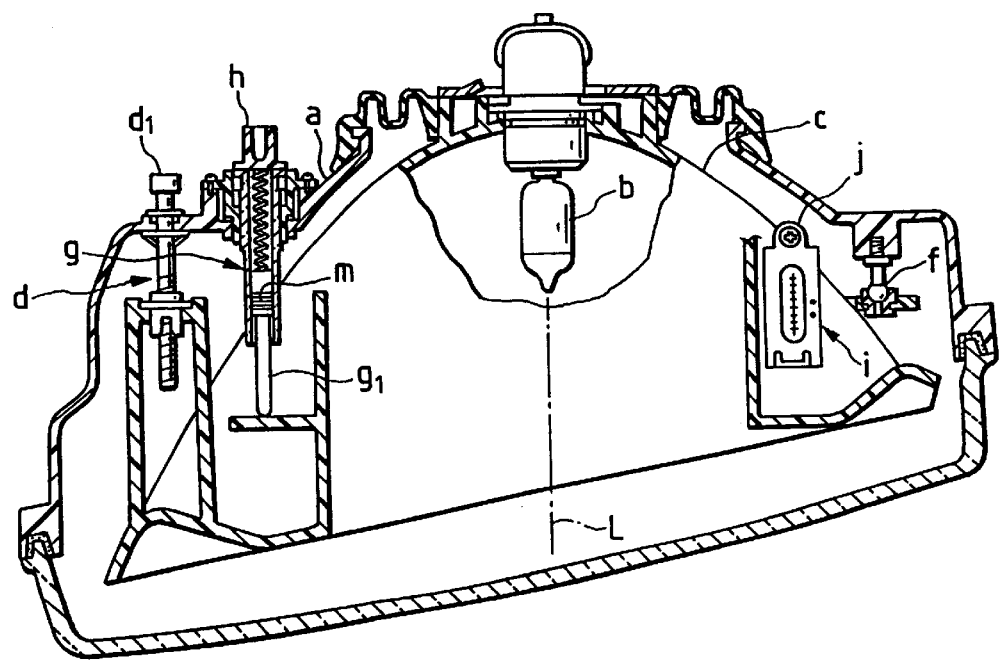

Now, FIG. 18 shows another embodiment (that is, an eighth embodiment) of the invention applied to a headlamp of a movable unit type which comprises a lamp housing serving as a reference member and a lamp body/reflector unit serving as an inclinable member. In particular, FIG. 18 is a horizontal section view of the above headlamp, showing a state thereof in which an inclination measuring device thereof is disposed at its given position.

In the eighth embodiment, in a horizontal plane containing therein the horizontal axis Lx of the upper surface wall 104a of a lamp body/reflector unit 104 in which a lamp body and a reflector are united together as an integral body, there are disposed an inclination measuring device 50 for measuring the inclination of the lamp body/reflector unit 104 in the right and left direction thereof, and a level 70 serving as an inclination measuring device for measuring the inclination of the lamp body/reflector unit 104 in the vertical direction thereof.

The inclination measuring device 50 is fastened by a screw to a hold member 110 mounted on a lamp housing 102, while the leading end portion of a slide member 60 is energized and contacted with a vertical wall 104c which is provided on and projected from the upper surface wall 104a of the lamp body/reflector unit 104. The rod contact surface 104$c_1$ is formed as an arc surface with the horizontal axis Lx as a center thereof, thereby preventing the scale of the inclination measuring device 50 from varying due to the inclining motion of the lamp body/reflector unit 104 in the vertical direction thereof.

Also, on the rear extension portion 150 (151, 152) of a fixed holder 52 serving as a measuring device case, there is mounted a cap 160A serving as a cover member, thereby preventing the rotation operation portion 56c of a movable holder 56 serving as a zero point adjustment operation portion from being exposed to the outside. By the way, reference character 103 designates an opening which is formed at a position of the lamp housing 102 corresponding to the rotation operation portion 56c. When mounting the cap 160A onto the rotation operation portion 56c, the cap 160A is mounted from the back surface side of the opening 103. On the other hand, in a state in which the cap 160A is not mounted, a rotation operating tool is engaged with the rotation operation portion 56c from the opening 103, so that the rotation operation portion 56c can be rotated using the rotation operating tool.

Also, the level 70 is fixed to the upper surface wall 104a of the lamp body/reflector unit 104 by a zero point adjust screw 78. And, the scale reading points of the inclination measuring devices 50 and 70 are set at such positions that can be seen easily from above the headlamp.

The remaining portions of the eighth embodiment are the same as those employed in the headlamp of a movable reflector type according to the first embodiment of the invention (FIGS. 1 to 8). Therefore, they are given the same designations and thus the description thereof is omitted here.

By the way, in the various embodiments described hereinabove, the vertical wall, which is used to surround the zero point adjustment operation portion of the inclination measuring device for measuring the inclination of the optical axis of the headlamp in the right and left direction, consists of the rear extension portion formed in the measuring device case. However, this is not limitative but, for example, there can also be employed a vertical wall which is formed in the lamp body or in the lamp housing.

As can be seen clearly from the foregoing description, according to a vehicle headlamp of the invention, since the zero point adjustment operation portion of the zero point adjust mechanism cannot be seen from the outside and thus the zero point adjustment operation portion cannot be operated in error on the user side, there is no fear that the zero point of the inclination measuring device can be out of order, thereby being able to always check by the inclination measuring device whether the optical axis of the headlamp in the right and left direction thereof is set at a proper position or not. And, when the optical axis of the headlamp is inclined in the right and left direction thereof, not only the inclination amount thereof can be measured accurately but also the optical axis of the headlamp can be adjusted to the proper position in the right and left direction by the aiming mechanism.

According to the invention, in a state in which the cap is mounted, the rotation operation portion can be rotated using the rotation operating tool which is inserted from the rear end opening of the measuring device case, so that the zero point adjustment of the inclination measuring device can be made.

Also, since the rotation operation portion of the zero point adjust screw is surrounded by the rear extension portion of the measuring device case, not only when the cap is mounted but also when it is not mounted, there is no fear that the zero point adjust screw can be rotated in error, which eliminates the possibility that the zero point of the inclination measuring device can be out of order.

Further, according to the invention, the cap can be mounted smoothly, which can facilitate the mounting operation of the cap.

Still further, according to the invention, since the rotation operation portion is prevented by the cap against rotation with respect to the rear extension portion, there is no fear at all that the zero point adjust screw can be rotated in error.

Moreover, according to the invention, in a state when the cap is not mounted, the rotation operation portion serving as the zero point adjustment operation portion projects from the measuring device case and, by operating or rotating the rotation operation portion, the zero point adjustment can be made smoothly. Also, by mounting the cap serving as a hide member on the rotation operation portion or on the measuring device case, the rotation operation portion serving as the zero point adjustment operation portion can be simply covered or hidden from the outside.

In addition, according to the invention, due to the fact that, after the aiming adjustment is made by the aiming mechanism, the aiming adjustment cannot be made freely on the user side, there is accordingly reduced the fear that the optical axis of the headlamp can be made out of order in error on the user side.

What is claimed is:

1. A vehicle headlamp comprising:
   a reference member mounted on and fixed to a vehicle body;
   an inclinable member including a light source mounted thereon, and disposed in said reference member inclinably with respect to said reference member for setting an optical axis of said headlamp;
   an aiming mechanism for adjusting the inclination of said inclinable member in the vertical direction thereof as well as in right and left directions thereof with respect to said reference member; and
   an inclination measuring device interposed between said reference member and said inclinable member for measuring the inclination of said optical axis of said headlamp in the right and left directions thereof;
   a zero point adjust mechanism disposed in said inclination measuring device, said zero point adjust mechanism being exposed outwardly of said reference member, said said zero point adjust mechanism comprising a zero point adjustment operation portion;
   a hide member mounted directly on said zero point adjustment operation portion or on a vertical wall formed integrally with said reference member so that said hide member surrounds said zero point adjustment operation portion and hides said zero point adjustment operation portion.

2. A vehicle headlamp as set forth in claim 1, wherein said zero point adjustment operation portion consists of a rotation operation portion formed in a rear end portion of a zero point adjust screw, said vertical wall consists of a rear extension portion formed in a measuring device case fixed to said reference member, said rear extension portion extends up a position beyond said rotation operation portion of said zero point adjust screw, and said hide member is composed of a cap mounted on said rear extension portion of said measuring device case.

3. A vehicle headlamp as set forth in claim 2, wherein said rear extension portion is composed of a plurality of tongue-shaped extension portions.

4. A vehicle headlamp as set forth in claim 2, wherein said cap is prevented against rotation with respect to said rear extension portion, and an engaging projecting portion provided on said cap is engaged with an engaging recessed portion formed on said rotation operation portion side, so that said cap is prevented against rotation with respect to said rotation operation portion as well.

5. A vehicle headlamp as set forth in claim 3, wherein said cap is prevented against rotation with respect to said rear extension portion, and an engaging projecting portion provided on said cap is engaged with an engaging recessed portion formed on said rotation operation portion side, so that said cap is prevented against rotation with respect to said rotation operation portion as well.

6. A vehicle headlamp as set forth in claim 1, wherein said zero point adjustment operation portion consists of a rotation operation portion formed in the rear end portion of a zero point adjust screw, said vertical wall consists of a rear extension portion formed in a measuring device case fixed to said reference member, said rear extension portion extends up a position beyond said rotation operation portion of said zero point adjust screw, and said hide member is composed of a cap mounted on said rotation operation portion and inserted into the interior portion of a measuring device case.

7. A vehicle headlamp as set forth in claim 1, wherein said zero point adjustment operation portion consists of a rotation operation portion formed in the rear end portion of a zero point adjust screw, said vertical wall consists of a rear extension portion formed in a measuring device case fixed to said reference member, said rear extension portion extends up a position beyond said rotation operation portion of said zero point adjust screw, and said hide member is formed of a filler member charged from the opening end portion of said rear extension portion of said measuring device case into a gap between said rear extension portion and said rotation operation portion and hardened therein.

8. A vehicle headlamp as set forth in claim 1, wherein said zero point adjustment operation portion consists of a rotation operation portion formed in the rear end portion of a zero point adjust screw, said vertical wall consists of a rear extension portion formed in a measuring device case fixed to said reference member, said rear extension portion extends up a position beyond said rotation operation portion of said zero point adjust screw, and said hide member is composed of a plate-shaped cover member so disposed as to extend through said rear extension portion and cross the opening end portion of said rear extension portion.

9. A vehicle headlamp as set forth in claim 1, wherein said zero point adjustment operation portion consists of a rotation operation portion formed in the rear end portion of a zero point adjust screw, said vertical wall consists of a rear extension portion formed in a measuring device case fixed to said reference member, said rotation operation portion projects backwardly of said rear extension portion of said measuring device case, and said hide member is composed of a cap mounted on said rotation operation portion in an idly rotatable manner or mounted on said rear extension portion of said measuring device case in an idly rotatable manner.

10. A vehicle headlamp as set forth in claim 1, wherein, in said reference member, there is disposed a rotation operation portion of an aiming screw included in said aiming mechanism for adjusting the inclination of said inclinable member in the right and left direction thereof in such a manner that said rotation operation portion is exposed, and a hide member is mounted directly on said rotation operation portion, or a hide member is mounted on a vertical wall so formed in said reference member as to not only extend therefrom but also surround said rotation operation portion, so that said rotation operation portion of said aiming screw is hidden by said hide member.

11. A vehicle headlamp as set forth in claim 1, wherein said reference member comprises a lamp body and said inclinable member comprises a reflector.

12. A vehicle headlamp as set forth in claim 1, wherein said reference member comprises a lamp housing and said inclinable member comprises a lamp body and a reflector unit.

\* \* \* \* \*